US012669300B2

(12) United States Patent
Won et al.

(10) Patent No.: US 12,669,300 B2
(45) Date of Patent: Jun. 30, 2026

(54) SYSTEMS AND METHODS FOR SMART BOILING CONTROL

(71) Applicant: The Regents of the University of California, Oakland, CA (US)

(72) Inventors: Yoonjin Won, Irvine, CA (US); Youngjoon Suh, Irvine, CA (US); Ramin Bostanabad, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 527 days.

(21) Appl. No.: 18/246,825

(22) PCT Filed: Oct. 1, 2021

(86) PCT No.: PCT/US2021/053232
§ 371 (c)(1),
(2) Date: Mar. 27, 2023

(87) PCT Pub. No.: WO2022/072875
PCT Pub. Date: Apr. 7, 2022

(65) Prior Publication Data
US 2023/0375292 A1      Nov. 23, 2023

Related U.S. Application Data

(60) Provisional application No. 63/086,337, filed on Oct. 1, 2020.

(51) Int. Cl.
*F28F 27/00* (2006.01)
*G06V 10/40* (2022.01)
(Continued)

(52) U.S. Cl.
CPC .............. *F28F 27/00* (2013.01); *G06V 10/40* (2022.01); *G06V 10/82* (2022.01); *G06V 20/60* (2022.01); *F28F 2200/00* (2013.01)

(58) Field of Classification Search
CPC ...... F28F 27/00; F28F 2200/00; G06V 10/40; G06V 10/82; G06V 20/60; G06N 3/043; G06N 7/046
See application file for complete search history.

(56) References Cited

U.S. PATENT DOCUMENTS 10,309,733 B2 * 6/2019 Kim ...................... F28F 13/187
11,137,220 B2 * 10/2021 Allred ................... F28F 13/187
(Continued)

FOREIGN PATENT DOCUMENTS

WO        2022072875 A1      4/2022

OTHER PUBLICATIONS

International Preliminary Report on Patentability for International Application PCT/US2021/053232, Report issued Mar. 28, 2023, Mailed on Apr. 13, 2023, 05 Pgs.
(Continued)

*Primary Examiner* — Thomas K Pham
(74) *Attorney, Agent, or Firm* — KPPB LLP

(57) ABSTRACT

Systems and methods for real-time boiling analysis and decision making in accordance with embodiments of the invention are illustrated. One embodiment includes a method for real-time smart boiling analysis. The method includes steps for receiving a set of one or more boiling images, identifying a set of bubble characteristics from the set of boiling images using a first model, identifying a set of image features from the set of boiling images using a second model, predicting a set of boiling heat characteristics based on the identified set of bubble characteristics, and controlling a flow boiling system based on the predicted set of boiling heat characteristics.

18 Claims, 17 Drawing Sheets

(51) Int. Cl.
  *G06V 10/82* (2022.01)
  *G06V 20/60* (2022.01)

(56) References Cited

U.S. PATENT DOCUMENTS

| | | | | |
|---|---|---|---|---|
| 2012/0170835 | A1* | 7/2012 | Wang | G06F 18/2193 |
| | | | | 382/159 |
| 2018/0017344 | A1* | 1/2018 | McCarthy | F28D 15/046 |
| 2018/0330238 | A1* | 11/2018 | Luciw | G06N 3/044 |
| 2020/0292251 | A1 | 9/2020 | Allred et al. | |

OTHER PUBLICATIONS

International Search Report and Written Opinion for International Application No. PCT/US2021/053232, Search completed Dec. 10, 2021, Mailed Jan. 21, 2022, 12 Pgs.

Alic et al., "Heat Flux Estimation an Pool Boiling Processes with Computational Intelligence Methods", Processes, May 17, 2019, vol. 7, No. 293, 16 pgs., doi:10.3390/pr7050293.

He et al., "Mask R-CNN", arXiv:1703.06870, Jan. 24, 2018, 12 pgs.

Insom et al., "Outlet Temperature Prediction of Boiling Heat Transfer in Helical Coils Through Artificial Neural Network", Proceedings, Jan. 7, 2020, vol. 39, No. 16, 4 pgs., doi:10.3390/proceedings2019039016.

Kalani et al., "Flow patterns and heat transfer mechanisms during flow boiling over open microchannels in tapered manifold (OMM)", International Journal of Heat and Mass Transfer, Oct. 2015, vol. 89, pp. 494-504, https://doi.org/10.1016/j.ijheatmasstransfer.2015.05.070.

Liu et al., "Data-driven modeling for boiling heat transfer: Using deep neural networks and high-fidelity simulation results", Applied Thermal Engineering, Nov. 5, 2018, vol. 144, pp. 305-320, https://doi.org/10.1016/j.applthermaleng.2018.08.041.

Nam et al., "Dynamical Analysis and Active Control for Flow Instabilities in Boiling Microchannel", International Journal of Heat and Technology, Mar. 2019, vol. 37, No. 1, pp. 203-211, https://doi.org/10/18280/ijht.370125.

Paz et al., "On the Application of Image Processing Methods for Bubble Recognition to the Study of Subcooled Flow Boiling of Water in Rectangular Channels", Sensors, Jun. 20, 2017, vol. 17, No. 1559, 21 pgs., doi:10.3390/s17061448.

Poletaev et al., "Bubble patterns recognition using neural networks: Application to the analysis of a two-phase bubbly jet", International Journal of Multiphase Flow, 2020, vol. 126, pp. 1-14, published online Dec. 26, 2019, https://doi.org/10.1016/j.ijmultiphaseflow.2019.103194.

Xiao et al., "Using artificial intelligence to improve identification of nano-fluid gas-liquid two-phase flow pattern in mini-channel", AIP Advances, vol. 8, Issue 1, Jan. 2018, pp. 015123-1-015123-13, DOI: 10.1063/1.5008907.

Zaborowska et al., "Boiling Flow Pattern Identification Using a Self-Organizing Map", Applied Sciences, Apr. 17, 2020, vol. 10, No. 2792, 14 pgs., doi:10.3390/app10082792.

Zhao et al., "Machine Learning-Based Critical Heat Flux Predictors in Subcooled and Low-Quality Flow Boiling", Young Professional Thermal Hydraulic Research Competition, Conference: 2018 ANS Winter Meeting (embedded International Topical Meeting on Advances in Thermal Hydraulics, Nov. 2018, 4 pgs.

\* cited by examiner

Imaging System
1510

Flow Boiling System

Flow Control Module
1525

1520

Smart Boiling Model
1505

SYSTEMS AND METHODS FOR SMART BOILING CONTROL

CROSS-REFERENCE TO RELATED APPLICATIONS

The current application is a national stage of PCT Patent Application No. PCT/US2021/053232 filed Oct. 1, 2021, which claims priority to U.S. Provisional Patent Application No. 63/086,337 filed Oct. 1, 2020, the disclosures of which are incorporated herein by reference in their entireties.

FIELD OF THE INVENTION

The present invention generally relates to boiling control and, more specifically, real-time smart boiling control using machine learning methods.

BACKGROUND

Boiling is arguably nature's most effective thermal management mechanism that cools submersed matter through bubble-induced advective transport. Central to the boiling process is the development of bubbles. Connecting boiling physics with bubble dynamics is an important, yet daunting challenge because of the intrinsically complex and high dimensional of bubble dynamics.

SUMMARY OF THE INVENTION

Systems and methods for boiling analysis in accordance with embodiments of the invention are illustrated. One embodiment includes a method for smart boiling analysis. The method includes steps for receiving a set of one or more boiling images, identifying a set of bubble characteristics from the set of boiling images using a first model, identifying a set of image features from the set of boiling images using a second model, predicting a set of boiling heat characteristics based on the identified set of bubble characteristics, and controlling a flow boiling system based on the predicted set of boiling heat characteristics.

In a further embodiment, the set of bubble characteristics includes at least one of the set consisting of bubble size and bubble count.

In still another embodiment, the first model includes a Mask R-CNN model and a multilayer perceptron (MLP) model.

In a still further embodiment, the second model includes a convolutional neural network (CNN), wherein the set of image features includes features identified at a set of one or more layers of the CNN.

In yet another embodiment, the set of boiling heat characteristics includes at least one of the set consisting of critical heat flux (CHF) and heat transfer coefficient (HTC).

In a yet further embodiment, controlling the flow boiling system comprises determining a target flow rate to achieve a desired set of boiling heat characteristics in the flow boiling system, and communicating with the flow boiling system to achieve the target flow rate.

One embodiment includes a non-transitory machine readable medium containing processor instructions for smart boiling analysis, where execution of the instructions by a processor causes the processor to perform a process that comprises receiving a set of one or more boiling images, identifying a set of bubble characteristics from the set of boiling images using a first model, and identifying a set of image features from the set of boiling images using a second model. The process further comprises predicting a set of boiling heat characteristics based on the identified set of bubble characteristics and controlling a flow boiling system based on the predicted set of boiling heat characteristics.

One embodiment includes a smart boiling analysis system comprising a set of one or more processors, and a memory connected to the set of processors, the memory storing instructions executable by the set of processors to receive a set of one or more boiling images from an imaging system, identify a set of bubble characteristics from the set of boiling images using a first model, and identify a set of image features from the set of boiling images using a second model. The instructions are further executable by the set of processors to predict a set of boiling heat characteristics based on the identified set of bubble characteristics and control a flow boiling system based on the predicted set of boiling heat characteristics.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
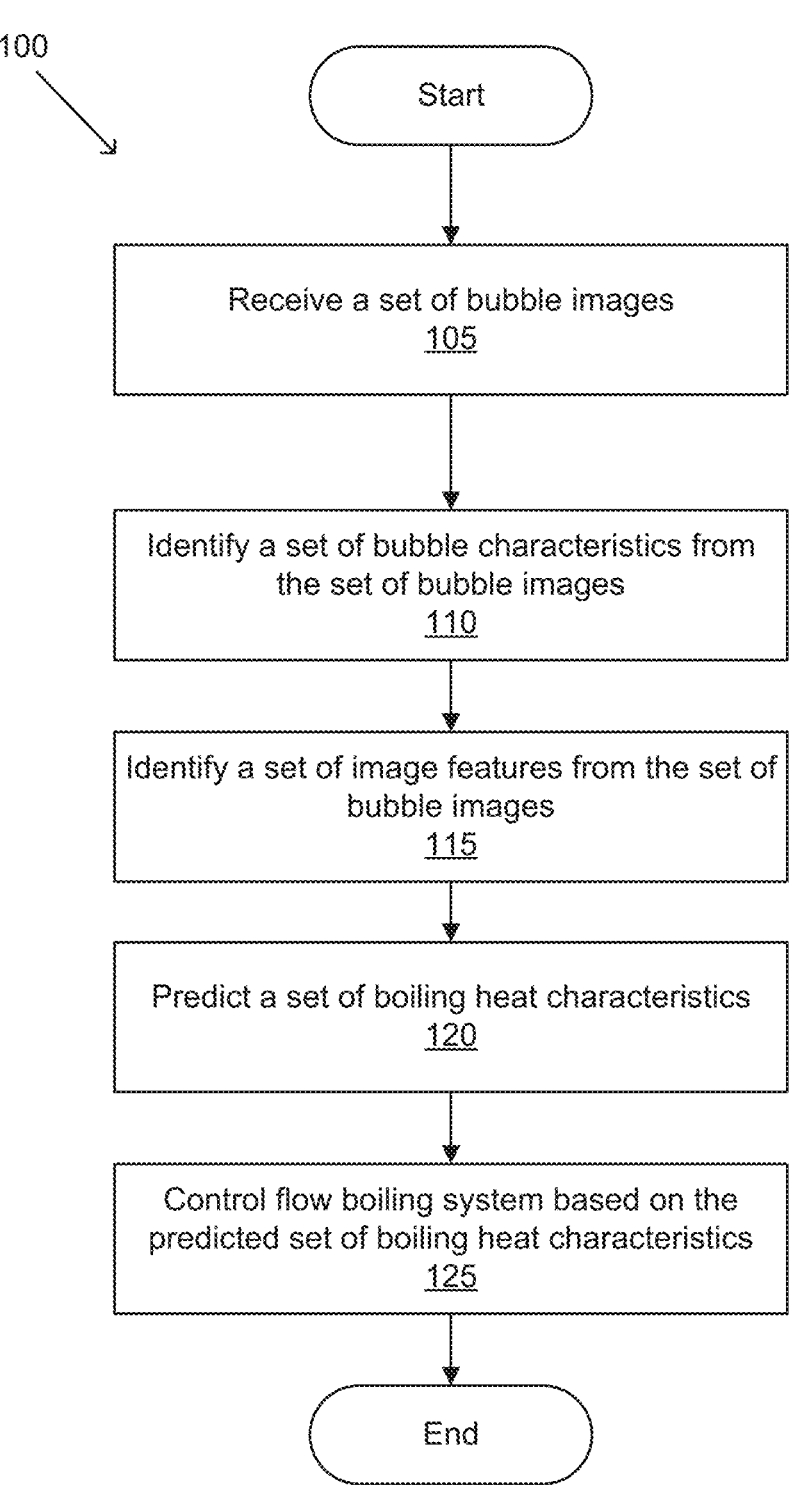
FIG. 1 illustrates an example of a process for controlling flow boiling systems in accordance with an embodiment of the invention.

Turning now to the drawings, systems and methods in accordance with certain embodiments of the invention can provide a method for smart boiling. In a variety of embodiments, systems can include a data-driven learning framework that correlates high-quality imaging on dynamic bubbles with associated boiling curves. The framework can leverage cutting-edge deep learning models including (but not limited to) convolutional neural networks and object detection algorithms to automatically extract both hierarchical and physics-based features. By training on these features, models in accordance with a number of embodiments of the invention can learn physical boiling laws that statistically describe the manner in which bubbles nucleate, coalesce, and depart under boiling conditions, enabling in situ boiling curve prediction with a mean error of 6%. Frameworks in accordance with several embodiments of the invention can offer an automated, learning-based, alternative to conventional boiling heat transfer metrology.

In a variety of embodiments, the method can include receiving a set of one or more bubble images from a boiling system, identifying bubble characteristics from the set of bubble images, identifying a set of image features from the set of bubble images, predicting a set of boiling heat characteristics based on the identified bubble characteristics and the set of image features, and controlling the boiling system based on the predicted set of boiling heat characteristics.

Controlling boiling systems in accordance with numerous embodiments of the invention can modulate flowrates through pump control panels remotely accessed by the computer that processes visualization data. In a variety of embodiments, smart boiling models can be trained to find the optimum flowrate based on different combinations of heat flux, surface temperature, and pressure drops. The model can be trained to predict the optimal flowrate based on provided image data.

As the heat generation at the device footprint continuously increases in modern high-power density systems, boiling heat transfer surfaces as an excellent remedy to many thermal management issues. Flow boiling can be a powerful strategy to remove massive thermal loads from a boiling surface but suffers from large bubble-induced pressure drops that can severely damage the system. The traditional workflow of flow boiling studies was to use passive control of flow boiling conditions with limited data analysis (e.g., surface, flow rate, working fluid). The passively optimized, boiling surfaces or boiling conditions are not suitable for electric systems where hotspot blueprints keep changing actively. While there has been increasing interest and demand for innovative flow boiling strategies, it has been difficult to actively control the flow boiling with synchronized image analysis due to the intrinsic complexity of boiling physics associated with bubble dynamics. While deep learning frameworks have surfaced as a new alternative to characterize boiling heat transfer, no system has yet been able to fully connect image data with boiling physics by using machine learning based systems in relation to electric input signals.

One of the many advantages of implementing smart flow boiling in accordance with many embodiments of the invention is its resource-effectiveness. Active controlling of flowrates for liquid cooling promotes efficient use of energy, which can substantially reduce costs and reduce the amount of greenhouse gases and other air pollution emitted as a result. In addition to the energy-efficiency, the learning framework through the image automation significantly will be faster and save time for researchers to analyze large datasets by synchronizing image data with the measured values.

Systems in accordance with various embodiments of the invention can enable computer vision assisted data analysis for the active control of boiling conditions. The computer vision assisted, in situ data analysis in accordance with some embodiments of the invention can quantify boiling characteristics through a visualization-based learning framework. Boiling frameworks in accordance with certain embodiments of the invention can correlate high-quality bubble images with boiling conditions (e.g., associated heat flux, temperature, and pressure profiles). In many embodiments, boiling frameworks can automatically leverage cutting-edge convolutional neural networks and object detection algorithms to automatically extract both hierarchical image- and physics-based features. By training on these features, boiling models in accordance with a variety of embodiments of the invention can learn physical boiling laws that statistically describe the manner in which bubbles nucleate, coalesce, and depart under boiling conditions, enabling in situ smart control of boiling conditions by reducing maximum junction temperature and pressure requirements.

In a variety of embodiments, systems can provide active and smart control of boiling conditions in a flow boiling setup by acquiring high-fidelity images. Active control in accordance with a variety of embodiments of the invention can be performed through automated real-time analysis of high-quality bubble images via trained deep learning models. Active control models in accordance with a number of embodiments of the invention can be trained to predict updated flowrate values which can balance heat flux, surface temperature, and/or pressure drops within the system. In numerous embodiments, appropriate flowrates can automatically be applied to the system (e.g., through a pump control panel). The techniques are applicable to any type of flow boiling system with minimum modifications to the original system and requires no additional cost.

An example of a process for controlling flow boiling systems in accordance with an embodiment of the invention is illustrated in FIG. 1. Process 100 receives (105) a set of bubble images. Process 100 identifies (110) a set of bubble characteristics from the set of bubble images. Process 100 identifies (115) a set of image features from the set of bubble images (120). Process 100 predicts (120) a set of boiling heat characteristics based on the identified set of bubble characteristics and the identified set of image features. Process 100 controls (125) the flow boiling system based on the predicted set of boiling heat characteristics.

While specific processes for controlling flow boiling systems are described above, any of a variety of processes can be utilized to control flow boiling systems as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Boiling is a heat transfer mechanism that utilizes liquid-to-vapor phase transition to dissipate great amounts of heat with minimal temperature difference. Since boiling enables a system to maintain fairly constant surface temperatures during large thermal energy fluctuations, many modern high power density systems such as power plants, power electronics, laser diodes, and photovoltaics rely on boiling for thermal management. The energy per unit area (i.e., heat flux) measures how much thermal energy is relieved via boiling and is a critical factor in characterizing boiling heat transfer. For instance, the efficacy of boiling heat transfer can be quantified by either the improvements in the critical heat flux (CHF) and/or heat transfer coefficient (HTC), both of which are functions of the boiling heat curves. With the goal of increasing the CHF limit and HTC, prior works have investigated the effects of flow condition, surface treatment and design, and bubble morphology on boiling curves. These past findings suggest that inherent structural characteristics as well as intrinsic material properties can significantly affect boiling performance, and therefore the boiling curve.

Quantification of boiling curves has been studied in many theoretical, numerical, or experimental works. Theoretical research on boiling mechanisms provided the foundations for heat flux estimation. However, the intrinsic complexity of the dynamic boiling phenomena has limited those theoretical studies to very simplified models. With numerical simulations, single to multi-bubble physics are investigated for detailed characterization of heat flux. Although direct numerical simulation of the boiling process enables studying dissipated heat flux at local and global scales, the accuracy of these simulations is debatable. Therefore, researchers still heavily rely on experiments to measure the boiling heat flux via, e.g., thermocouples, electrical power input, or infrared (IR) techniques. However, these experimental methods are inefficiently connected with visual information, which can be a huge downfall for providing a clear description of dynamic boiling physics.

Smart boiling systems and methods in accordance with a number of embodiments of the invention can provide a bridge between measurements and visual information to relate surface design inputs (e.g., surface morphology, material type, and/or surface chemistry) and boiling statistics (e.g., bubble size, count, shape, trajectory, velocity vectors, and bubble-bubble interactions) with boiling curves (e.g., CHF and HTC). Despite the significance of gathering essential visual information, current measurement setups fail to synchronically analyze image data without extensive user involvement, which is not only time-consuming, but can also introduce user bias. In various embodiments, systems and methods can include a non-destructive and automated optical method that can provide in situ heat flux quantification during boiling.

Current advances in deep learning and, in particular, convolutional neural networks (CNNs) have enabled automatic and scalable image analysis for, e.g., object detection, classification, and even image-based predictions. Many CNN-based deep learning frameworks are effective because CNNs emulate the human brain's natural visual perception mechanism by systematically learning features through multiple operational layers. Image-based deep learning models in accordance with various embodiments of the invention can play a vital role in fully understanding boiling physics because boiling images may be richly embedded with bubble statistics (e.g., bubble size, count, trajectory, and velocity vectors), which are quantitative measurements of the dynamic boiling phenomena. Despite the potential for understanding image-based boiling physics via deep learning frameworks, very few attempts have been made to build them. Recent works have developed a framework to classify boiling regimes and to quantify boiling heat transfer. However, the boiling experiments in these studies are conducted on one-dimensional (1D) wires, which cannot represent the complex and volatile bubble motions associated with realistic two-dimensional (2D) or three-dimensional (3D) surfaces. Many past models were unable to evade the notorious title of being indiscernible black boxes that predict outputs with given input parameters, without providing any description about the related physics. In addition to this, there have been no such an effort to practice machine learning based computer vision link bubble dynamics and boiling processes.

Figure 2:
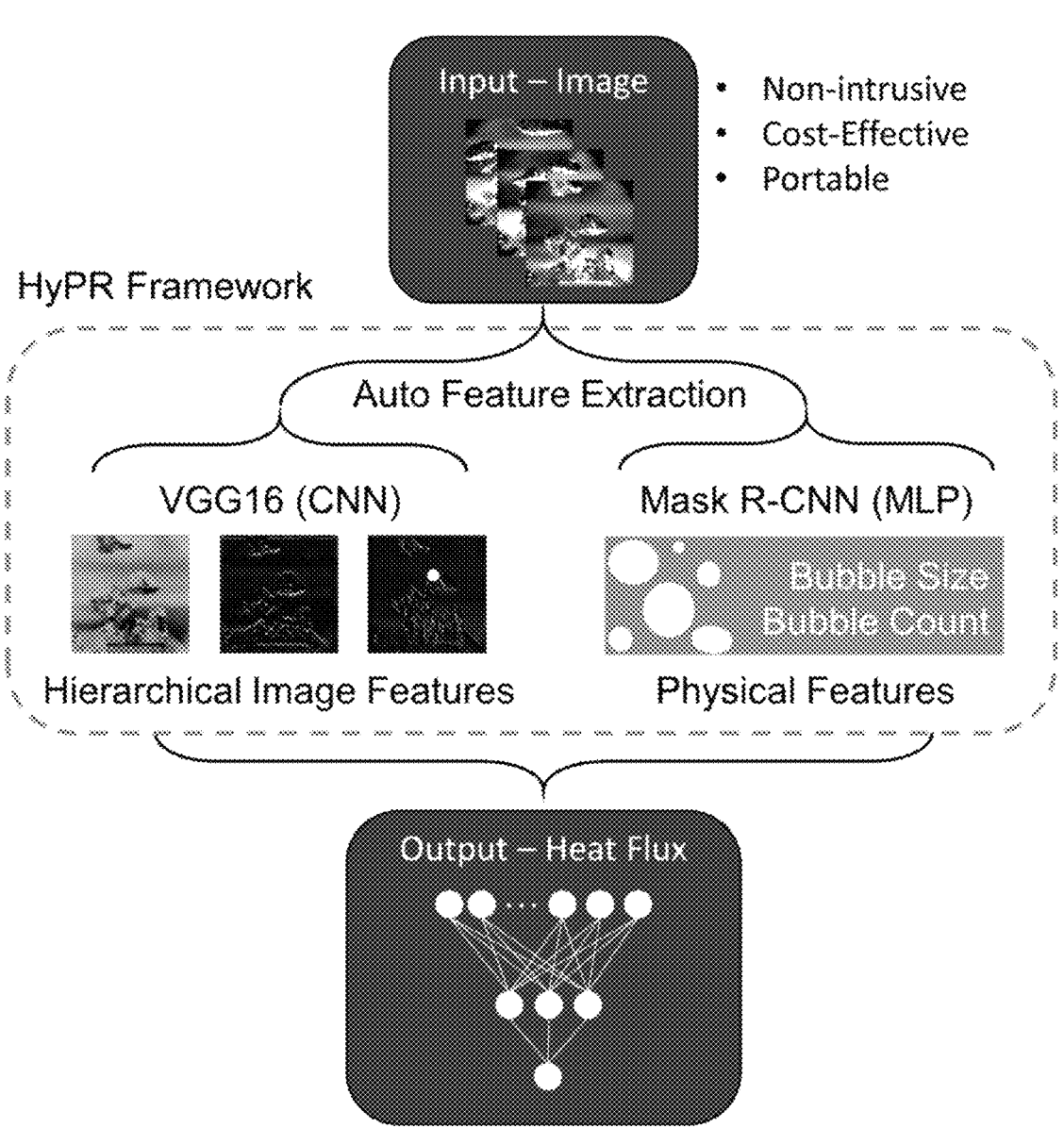
FIG. 2 illustrates a physics-reinforced learning framework schematic in accordance with an embodiment of the invention.

Systems in accordance with various embodiments of the invention can provide a data-driven boiling analysis framework that can predict boiling heat flux based on high-quality bubble images in real-time (FIG. 2). Boiling analysis frameworks in accordance with various embodiments of the invention can conceptualize state-of-the-art CNNs and object detection algorithms to automatically extract hierarchical image features as well as physics-based bubble statistics to learn inherent boiling physics. By training on these features, frameworks can not only describe the manner in which the bubbles nucleate and depart under boiling conditions, but also predict the boiling curves with a mean error of 6% using a small dataset. Boiling analysis frameworks can provide quantitative descriptions of underlying boiling activities that can potentially help discover unknown boiling laws.

A physics-reinforced learning framework schematic in accordance with an embodiment of the invention is illustrated in FIG. 2. Remotely acquired images can be provided to the framework where cutting-edge convolutional neural network (CNN) architectures and advanced object detection algorithms automatically extract features. The proposed framework in accordance with a number of embodiments of the invention can learn from a hierarchy of image features as well as boiling physics with the aim of predicting real-time boiling heat flux. In a variety of embodiments, frameworks in accordance with numerous embodiments of the invention can learn from a hierarchy of image features as well as boiling physics with the aim of predicting the optimum flowrate required to optimize the boiling conditions.

Figure 3:
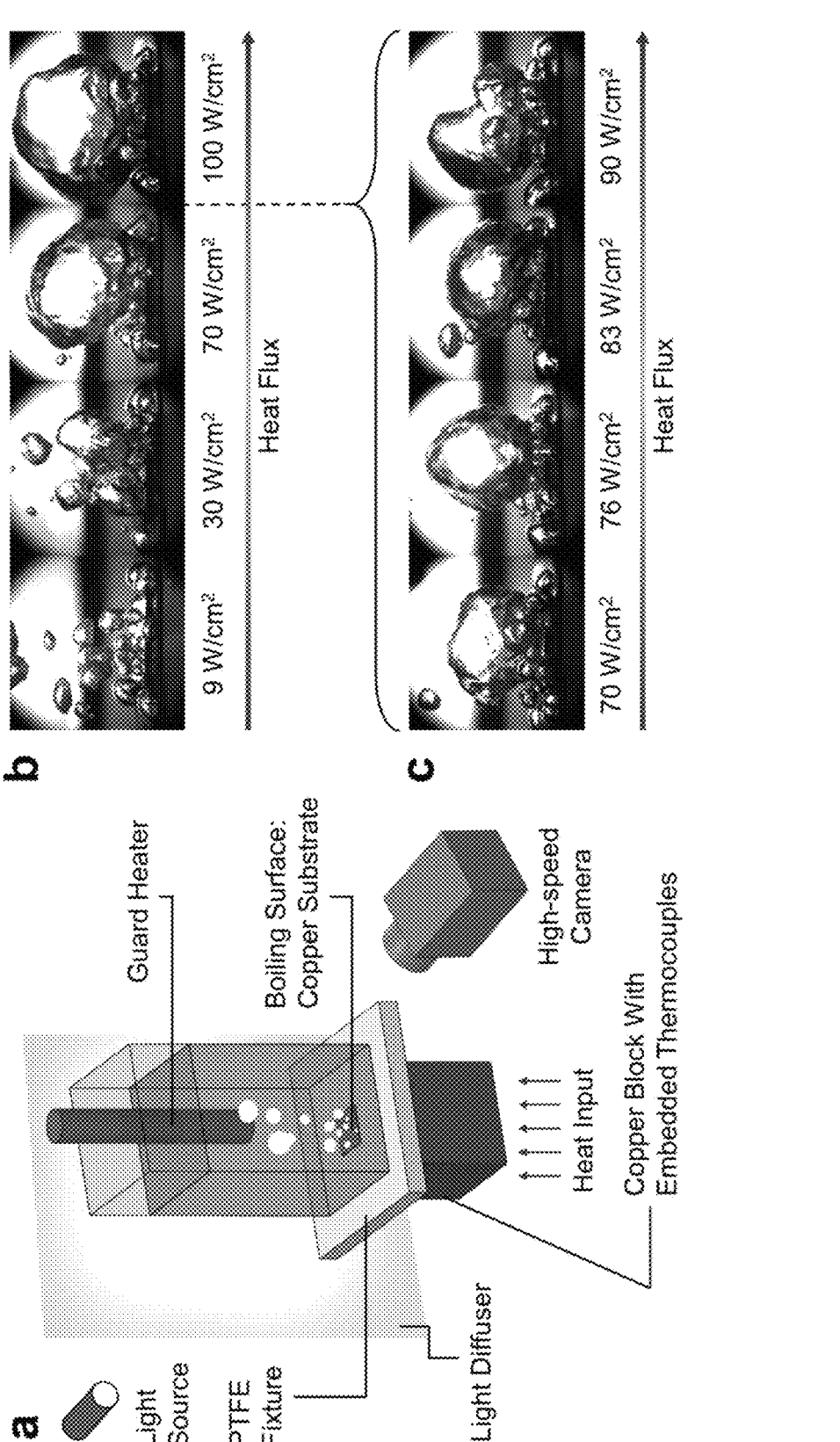
FIG. 3 illustrates an example of an experimental setup and imaging techniques.

An example of an experimental setup and imaging techniques is illustrated in FIG. 3. In FIG. 3a, all pool boiling experiments are conducted on a pool boiling rig with fixed thermal attachment, consistent imaging distance, and an identical plain copper substrate. FIG. 3b shows temporal bubble images captured from the high-speed camera confirm that it is challenging to differentiate bubble changes with small heat flux steps. FIG. 3c shows that the changes in bubble appearance become more noticeable when heat flux steps are relatively large.

Results

Hierarchical Feature Extraction

Boiling analysis frameworks in accordance with a number of embodiments of the invention can employ convolutional neural networks (CNNs) to extract hierarchical image features (see FIG. 3a and Methods for data acquisition). Primitive features such as edges and corners are at the lower levels of this hierarchy, whereas more abstract features (e.g., the existence of a bubble) are at the higher levels. Using these hierarchical features, CNN models can recognize small and critical details in images that the human eye may not perceive. While it has been challenging to differentiate bubble images between relatively small boiling heat flux steps (<20 W/cm$^2$) (FIG. 3$b$), the CNN's recognition capability makes this task possible. In contrast to the images within similar heat flux ranges, the bubble images display quite distinguishable changes across relatively large heat flux steps (>20 W/cm$^2$) (FIG. 3$c$), which has been the ranges investigated and analyzed in conventional boiling studies. In some embodiments, deep CNNs can be employed because they can learn more efficiently than shallow CNNs by naturally integrating incredibly enrichened image features. A representative robust and easily-trainable deep CNN architecture, VGG16, is selected for this study. Regardless of the high performance of VGG16, the complex and spontaneous nature of the boiling bubble dynamics could still require thousands of images per class to learn from the scratch, leading to a substantial cost of data analysis. In several embodiments, a transfer learning technique, called fine-tuning, can be performed to retrain a pre-trained CNN network on a specific task (e.g., bubble image recognition (see Supplementary Information, FIG. 7).

Physics-Based Feature Extraction

Figure 4:
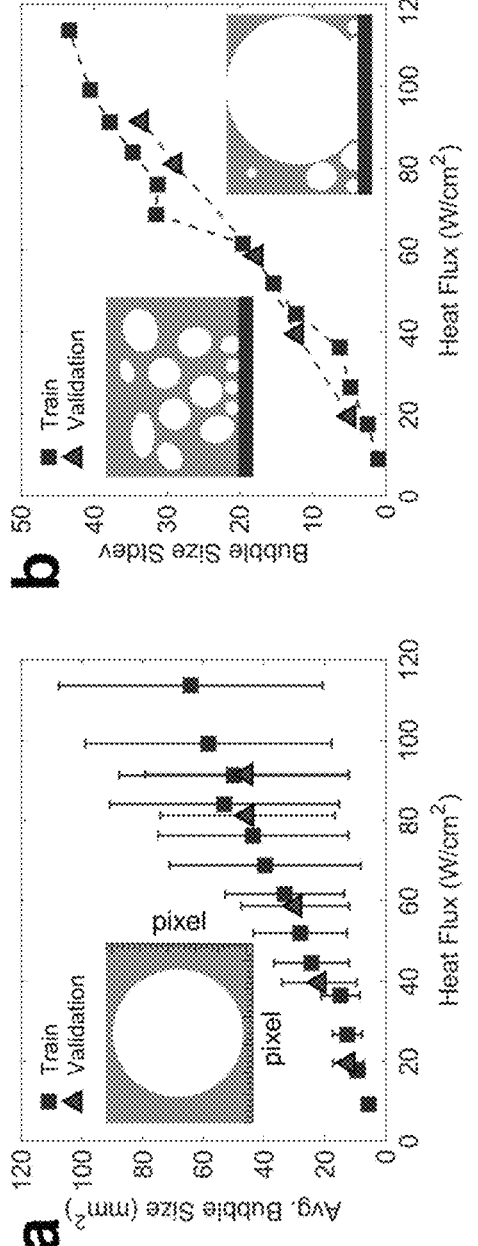
FIG. 4 illustrates bubble parameters obtained from a Mask R-CNN data analysis as a function of boiling heat flux.
Figure 4:
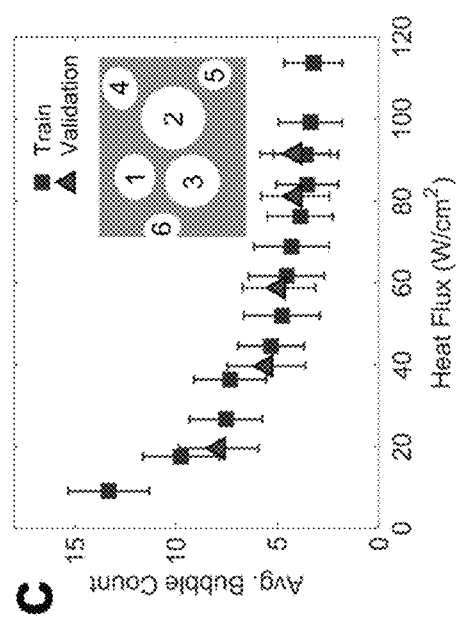

In numerous embodiments, boiling analysis frameworks can employ advanced object detection algorithms to extract pre-determined features (i.e., bubble statistics) that provide clear physical meaning from a group of images. The relationship between bubble statistics (e.g., bubble size and count) and heat flux is well-described in previous studies; higher heat flux increases the wall superheat, thereby facilitating bubble growth and coalescence. Image-based deep learning models can play a vital role in fully understanding boiling physics because boiling images are richly embedded with bubble statistics, which are quantitative measurements of the dynamic boiling phenomena. However, manual extraction of such detailed information from thousands of images is laborious and time-consuming. To automate image analysis, processes in accordance with a number of embodiments of the invention can utilize instance segmentation models (e.g., Mask R-CNN) to automatically detect and record bubble statistics by measuring individual bubbles in each time frame. See Methods Section for Mask R-CNN training process. FIG. 4 displays bubble parameters obtained from a Mask R-CNN data analysis as a function of boiling heat flux. As the boiling continues with incremental increases of the power, the number of bubbles coalescence events increases, displaying a linear correlation between the bubble size and boiling heat flux in FIG. 4$a$. The inset shows that the bubbles sizes are originally extracted as pixel values. The pixel values are converted to mm$^2$ bubble sizes using a commercial program ImageJ and then averaged over the corresponding heat flux.

The error bars in FIG. 4$a$ represent the bubble size deviation, which also linearly correlates with the boiling heat flux in FIG. 4$b$. Low heat fluxes have small standard deviations, which means bubbles sizes are relatively uniform. As heat flux increases, the difference becomes small and large bubbles become increasingly noticeable and is reflected in the plot. The bubble size differences for low and high heat fluxes are illustrated in the inset. The linear increase in bubble size deviation describes the presence of both small and large bubbles in the same image frame at high heat fluxes. It is evident that vigorous bubble coalescing events expedite bubble growth and continuous bubble genesis on heated surfaces.

In contrast to the linear increase in bubble size, the average bubble count exponentially decreases as heat flux increases in FIG. 4$c$, due to the active bubble coalescence events. The inset portrays individual bubbles that are identified and counted. The measurements are performed on the train and validation datasets, as described in the Methods Section. The good agreement between those datasets in FIGS. 4$a$-$c$ implies that the bubble statistics are repeatable and thus suitable to predict the boiling curves. By selecting the optimal combination of heat flux, surface temperature, and pressure, models in accordance with several embodiments of the invention can be trained to predict the flowrate outcome by viewing images in real-time.

In certain embodiments, bubble statistics can then be processed through multi-layer perceptron (MLP) neural networks, where feature weights can be adjusted to learn boiling physics. In many embodiments, MLP networks can be implemented because, unlike CNNs, segmentation models may only extract features and therefore may need an additional network to train them. MLP neural networks in accordance with a variety of embodiments of the invention can use a group of images (e.g., collected over a few seconds) per each heat flux step as the input, whereas individual images per each heat flux step can be processed through CNNs. In various embodiments, aggregated bubble statistics (e.g., bubble size, count, shape, trajectory, velocity vectors, and bubble-bubble interactions) can be incorporated in the CNN's prediction in a hybrid format, to improve the prediction accuracy. Since prediction models are predominantly built around the MLP network, the compiled Mask R-CNN and MLP neural network model may be denoted as the MLP model throughout this description.

Although many of the examples described herein CNNs, MLPs and/or Mask R-CNNs, one skilled in the art will recognize that similar systems and methods can be used in conjunction with various different models, such as (but not limited to) recurrent neural networks (RNNs), decision trees, image segmentation algorithms, regression models, etc., without departing from this invention.

Hybrid Physics-Reinforced Framework

Figure 5:
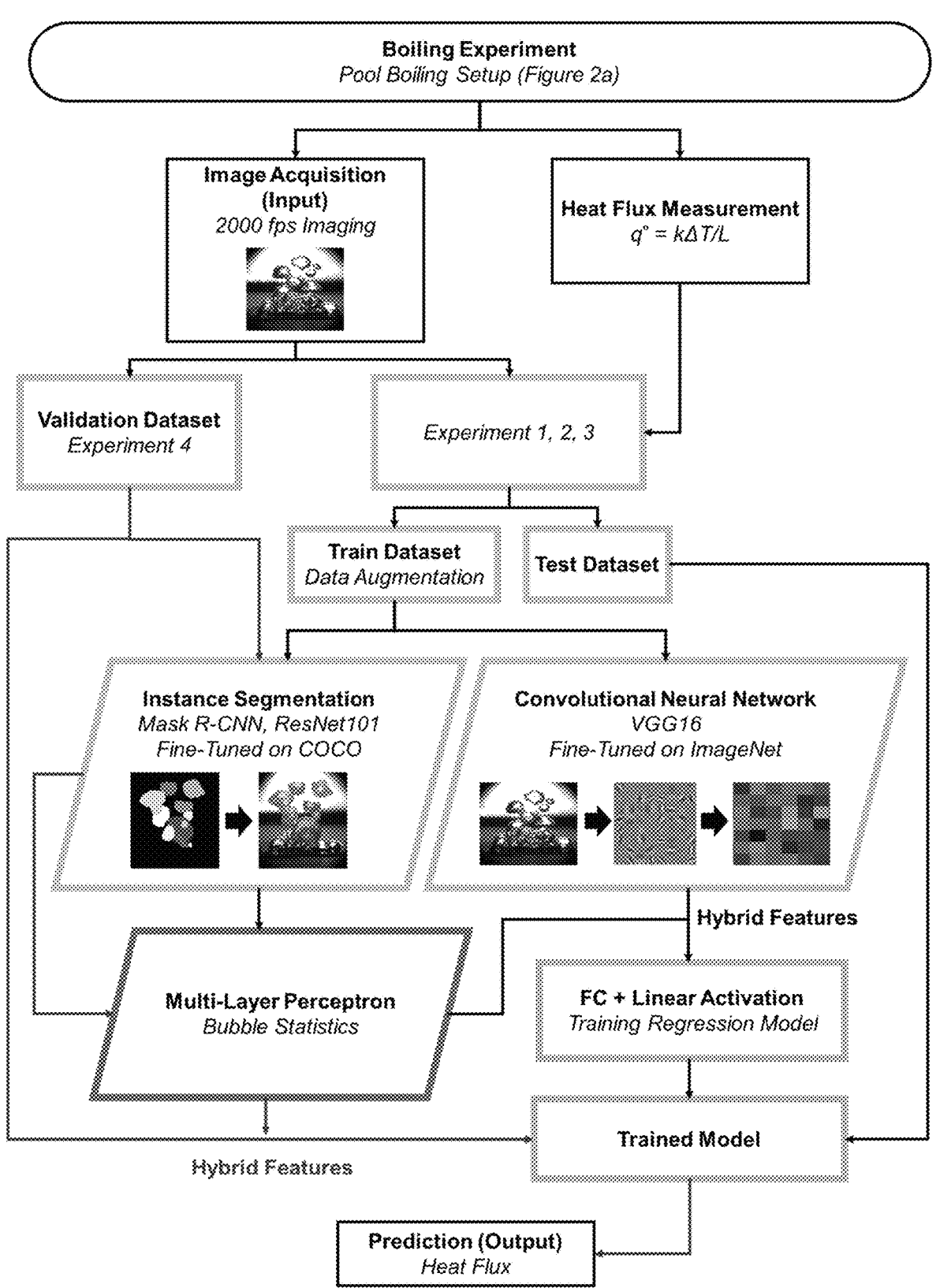
FIG. 5 illustrates an example of how datasets are processed in the HyPR model.

Boiling analysis frameworks for hybrid physics-reinforced (HyPR) frameworks) can predict boiling heat flux by extending and coupling deep learning models (e.g., CNNs, MLPs, Mask R-CNN, etc.) as described herein. As described in FIG. 8 in detail, the coupling process of CNNs and MLPs can reinforce the model by complementing unique learning strategies of each method; the CNN is capable of recognizing subtle visual alterations (e.g., light diffractions and bubble patterns) without learning the reason why they deviate from original values; whereas the MLP neural network recognizes how bubbles should behave in relation to boiling laws without learning any significant visual variations. FIG. 5 illustrates an example of how datasets are processed in the HyPR model. Images from the high-speed measurements can be distributed into train, test, and validation datasets where only the train datasets are applied with data augmentation for dataset diversification. The augmented images are then simultaneously fed through VGG16 CNN and Mask R-CNN networks where image features and bubble statistics can be extracted, respectively. It should be noted that the Mask R-CNN model can already be pre-trained to automatically detect and segment bubble images. The bubble statistics exported from Mask R-CNN can be additionally processed through MLP neural networks before being concatenated with the CNN outputs. In numerous embodiments, the outputs through the coupled CNN and MLP networks are then fully connected and applied with a linear activation function, which enables the HyPR model to predict continuous heat flux values. The HyPR model in accordance with numerous embodiments of the invention can be fine-tuned (e.g., on ImageNet) and saved to be assessed with the validation dataset.

Training Results

The loss graphs in FIG. 6a show that the HyPR model performs well within its trained conditions (experimental sets 1-3). FIGS. 6b and c compare the training results for isolated image feature-based (i.e., CNN) and bubble-statistic-based (i.e., MLP) prediction models. See Methods Section for detailed training process. For the CNN model, the test loss is relatively lower than the train loss and display more noise compared to the other models. The high train loss with respect to test loss is attributed to data augmentation being applied only on the train dataset, making test dataset images easier to predict. On the other hand, the hybrid model shows much smoother decay than CNN models, verifying the effectiveness of using combined features. The testing loss for the HyPR, CNN, and MLP models are 2.4, 7.1, and 5.3, respectively. While all three models test with relatively low losses, it is imperative to further examine whether the model can realistically generalize to independent experimental sets by using the validation dataset.

FIG. 5 illustrates a flow chart for a Hybrid physics-reinforced (HyPR) model in accordance with an embodiment of the invention. Heat flux information is used as labels for the train dataset to provide answers during the training process. All processes have no access to heat flux information during testing and validation. The pre-trained Mask R-CNN model extracts bubble statistics and processes the features in the MLP network before being combined with the hierarchical image features extracted by the CNN. The validation dataset is used to evaluate the HyPR model's real-time capability for the boiling heat flux prediction. Yellow, blue, and green frames represent image data, numeric bubble statistics, and the combination of the two data types.

Figure 6:
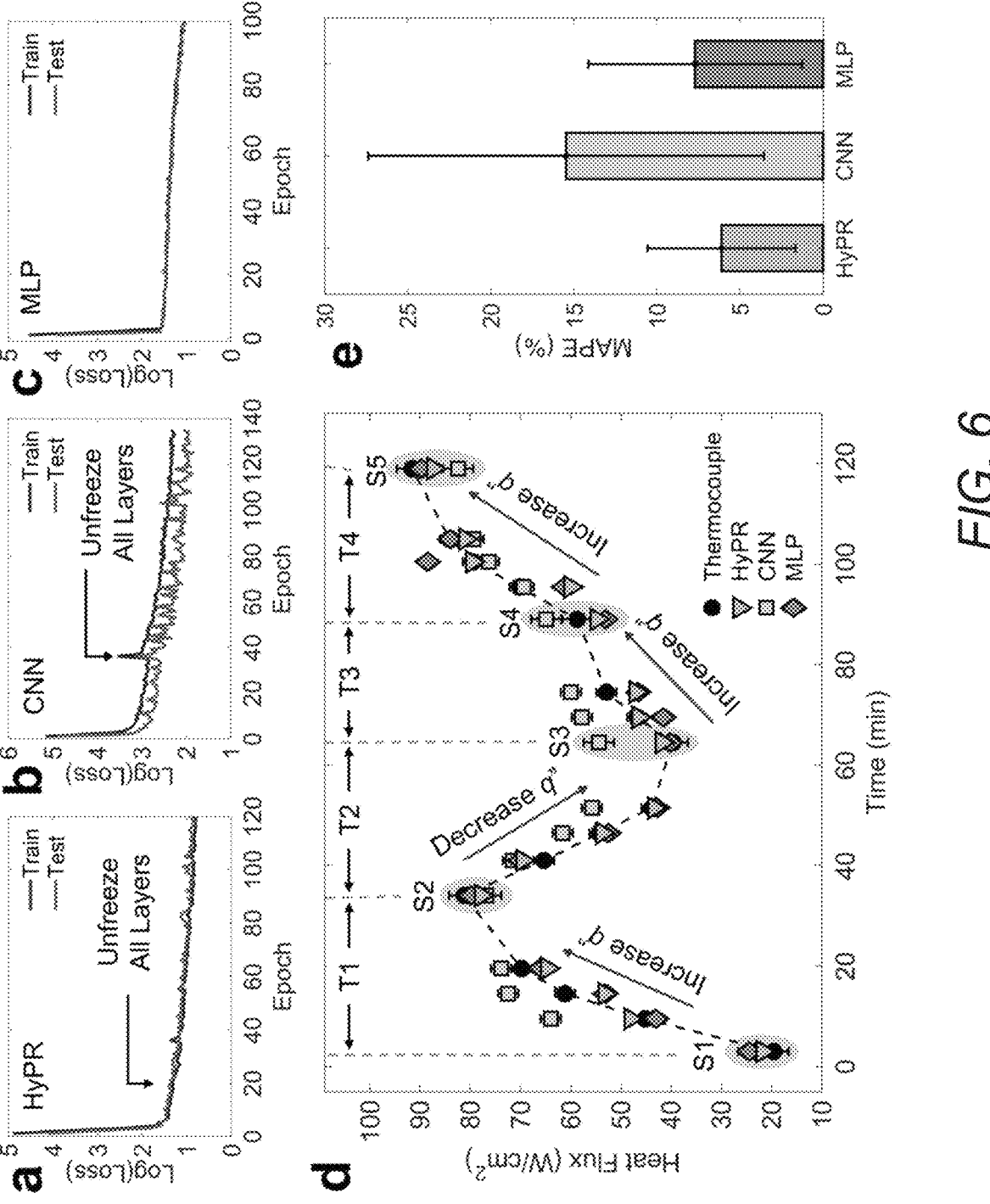
FIG. 6 illustrates real-time prediction of boiling heat flux using trained deep learning models in accordance with an embodiment of the invention.

FIG. 6 illustrates real-time prediction of boiling heat flux using trained deep learning models in accordance with an embodiment of the invention. The training results for the HyPR (a), CNN (b), and MLP (c) models show all three models can learn well from the teaching dataset with a testing loss of 2.49, 7.11, and 5.36, respectively. The losses are plotted in log scales to show the exponential decay. In 6d, the trained models predict real-time steady state (S1-5) and transient state (T1-4) heat fluxes. The HyPR and MLP models respond well to the increasing and decreasing boiling curves, demonstrating minimal deviations. In contrast, the CNN models follow the general trend of the varying heat flux; however, the models overpredict mid-range heat fluxes from 40-60 W/cm$^2$. Error bars represent the standard deviation of the predictions of all 500 images for each heat flux step. Mean absolute percentage errors (MAPE) characterize the realistic prediction accuracy, where the HyPR, CNN, and MLP models report 6%, 15%, and 8% mean error, respectively. The error bars show the standard deviation of MAPE.

Real-Time Prediction of Boiling Heat Flux

By using the validation dataset, the real-time boiling heat flux prediction can be compared by using all three models with heat flux calculations based on thermocouple measurements. During the boiling experiments, the power input for the validation dataset is spontaneously increased or decreased for five heat flux steps (S1-5). Between steady states, transitional states (T1-4) are also measured to confirm the models' ability to identify real-time boiling heat flux changes. In FIG. 5d, the prediction values of HyPR, CNN, and MLP models are indicated by using green, yellow, and blue markers, respectively, and the thermocouple measurements are shown in black circles. While all three models predict the general increasing- or decreasing-trend of the new dataset, the CNN model deviates the most from thermocouple measurements and overpredicts mid-range boiling heat fluxes, which are 50-80 W/cm$^2$. The error bars in FIG. 6d indicate the standard deviations of heat flux measurements and model predictions. The errors from thermocouple measurements are translated to real-time heat flux changes during transitional steps and measurement uncertainties. The errors from the model predictions represent prediction fluctuations caused by the model making predictions for individual images. The prediction fluctuations of HyPR model are greatly minimized to near nullity, supporting the hypothesis that the bubble statistics features function as prediction guidelines for the hierarchical image feature-based predictions. It should be noted that the prediction fluctuations are relatively high for the CNN models because they operate on an individual image-basis. In contrast, the prediction fluctuations of MLP model cannot be calculated because the MLP model predictions are based on averaged numerical bubble statistics.

The prediction accuracy can be quantified by calculating the mean absolute percentage error (MAPE), which is defined as:

$$MAPE = \frac{1}{n}\sum_{i=1}^{n}\left|\frac{q''_{measured} - q''_{predicted}}{q''_{measured}}\right| \times 100 \qquad (1)$$

where $q''_{measured}$ is the thermocouple-based reading and $q''_{predicted}$ is the model's prediction. The absolute value in this calculation is summed for every predicted feature set and is divided by the total number of images n. FIG. 6e shows the MAPE values for each model, where the HyPR model shows a minimum MAPE of 6%, while the predictions models using CNN and MLP show 15% and 8% MAPE, respectively. The error bars show the standard deviation of MAPE over all heat flux steps. The HyPR model exhibits relatively smaller deviations than the MLP model while both models exhibit similar MAPE. This suggests that the use of hierarchical image features in the HyPR model positively impacts the prediction capability of the hybrid model. Generally, MAPE is known to decrease as the training dataset size increases at the expense of increased training cost. Despite the advantages of using a large image dataset, the model was intentionally trained on a small (250 image per class) dataset while achieving similar MAPEs compared to the recent work with 91% dataset size reduction[47], which confirms that the collective effectiveness of coupling multiple learning techniques (e.g., CNN, Mask R-CNN, MLP, fine-tuning, data augmentation, etc.) performs well. It should be noted that the increases in the dataset size can further improve the MAPE by providing extra learnable image and bubble statistic features with additional computational cost.

Discussion

A great advantage of using deep learning techniques is their flexibility to be upgraded to improve in any possible directions by adjusting tasks or leveraging new algorithms. For instance, boiling curves are often correlated with surface structures, which makes the framework suitable for detecting potential surface changes during boiling conditions. Nanotextured surfaces are known to have more bubble nucleation sites than plain surfaces, which can cause excessive bubble coalescence and eventuate in premature CHF. The previous findings show a good agreement with preliminary boiling curve measurements of plain and nanotextured surfaces in FIG. 9 where the nanotextured surface showcases larger average bubble size as well as lower bubble count at similar heat fluxes. The different signals between plain and nanotextured surfaces are clear such that they can help differentiate the surface types in detail or identify the surface deterioration. As with the capability to characterize different surfaces through an agglomeration of spatial bubble statistics, models in accordance with certain embodiments of the invention can be used to study spatiotemporal evolutions of predetermined features (e.g., bubble size, count, shape, trajectory, velocity vectors, and bubble-bubble interactions) by implementing tracking algorithms.

Perhaps more importantly, the use of deep learning framework can be resource effective, in experimental and computational manners. For instance, visualization-based methods can be remote, so that the measurements can be conducted over multiple boiling setups with minimum space requirements. Furthermore, processes in accordance with various embodiments of the invention can be cost-effective. Conventional methods using thermocouple and electrical power input setups require wired attachments (i.e., probes and multimeters) while IR cameras need dichroic mirror fixture stages and can only conduct bottom-to-top imaging. In many cases, these attachments substantially increase the costs of boiling devices at both lab and commercial scales. In addition to the space and cost considerations, the learning framework through the image automation significantly saves computational time to analyze large-size datasets by synchronizing image data with the measured values. While high-resolution images are extremely memory-expensive, the transfer learning and data augmentation techniques can reduce the required image dataset size and model training time. The resource-effective framework demonstrated here will help describe other types of image-based transport phenomena to impact the heat transfer community.

Methods

Experimental Setup

In an experimental setup, high-fidelity bubble images were captured from four consecutive pool boiling experiments using the setup shown in FIG. 3a. The pool boiling rig mainly consists of the boiling surface, a heating block, a data acquisition device connected to thermocouples, and a high-speed camera. The boiling surface is a 1 cm×1 cm plain copper sample, which is soldered and left attached on a custom-built copper heating block in all measurements to ensure consistent thermal contact resistance. The boiling surface is cleansed for 5 minutes before each experiment via a piranha solution. The heating block consists of four cylindrical cartridge heaters, which can be heated by AV voltage regulator (Variac Transformer), where an insulating glass wool thoroughly encloses the copper block to promote one-dimensional thermal conduction. The generated heat flux is calculated by taking the average heat flux $q''=k\Delta T/L$ measured from four K-type thermocouples positioned incrementally along the copper heating block where k is the thermal conductivity and $\Delta T$ is the temperature difference measured between a prescribed distance L. The uncertainty of thermocouple measurements is ±1° C., which leads to an estimated uncertainty of 2.2% at the maximum heat flux by using the law of propagation of uncertainty (see Supplementary Information). The train and test dataset heat fluxes can be measured only during steady states while the validation dataset includes both steady and transitional state measurements to demonstrate real-time prediction. Furthermore, the input heat fluxes in the validation dataset can be arbitrarily raised and lowered to test the model's robustness. A data acquisition device (Labjack U6) records temperatures for approximately 3 minutes during both steady and transitional states. Above the boiling surface, a transparent guard heater-installed boiling chamber maintains degassed DI water in saturation conditions by receiving signals from a PID controller.

Real-Time Data Acquisition

Pool boiling images and videos can be obtained via a high-speed camera (FASTCAM Mini AX50). Since high resolution images convey important bubble statistics in relation to the boiling heat flux, the image resolution is set to 1024×1024 pixels in this study. To improve the imaging quality, a light diffuser is placed opposite from the camera to evenly distribute background lighting (FIG. 3a). High speed imaging of 2,000 fps improves the image quality even further by reducing motion blurs. On the other hand, high-speed imaging can produce overly correlated image datasets if captured in high frame sequences. Highly sequential image datasets, in turn, risk being biased towards only a few numbers of bubbles and requires unnecessarily many images to increase the dataset diversity. To minimize potential bias to the identification process caused by highly correlated frame sequences, processes in accordance with various embodiments of the invention can capture images at random time frames (i.e., randomized imaging) for a duration of 30 seconds. The structural similarity index (SSIM) confirms the image dataset correlation by comparing two images, where SSIM=1 corresponds to identical images and SSIM=0 indicates completely uncorrelated images. The SSIM plot in FIG. 10a shows that the randomized imaging dataset display relatively lower SSIM indexes than the sequential imaging dataset. The higher correlation of sequential images becomes clearer in the histogram plot (FIG. 10b), where a greater number of high SSIM indexes are observed. On the other hand, randomized images are well distributed (i.e., less correlated) and form a gaussian curve with a relatively low mean SSIM index of 0.6. Therefore, randomized imaging techniques can be employed to collect 250 images for each heat flux step, which provides the total of 3,250 images to train the model.

Datasets

We split the collected images into a train, test, and validation set. Among the four boiling experiments, the images collected from the first three experiments can be divided into 80% train and 20% test datasets. Train sets can be labeled with heat flux measurements that provide answers required to train the model. In contrast, test sets consist of unlabeled images from the same experimental pool and verify the model's ability to predict unencountered images. Unlike the test set, the validation set images are collected from the last, separate experiment and can be used to evaluate the model's ability to generalize towards independent experimental conditions.

Training Mask R-CNN

Figure 11:
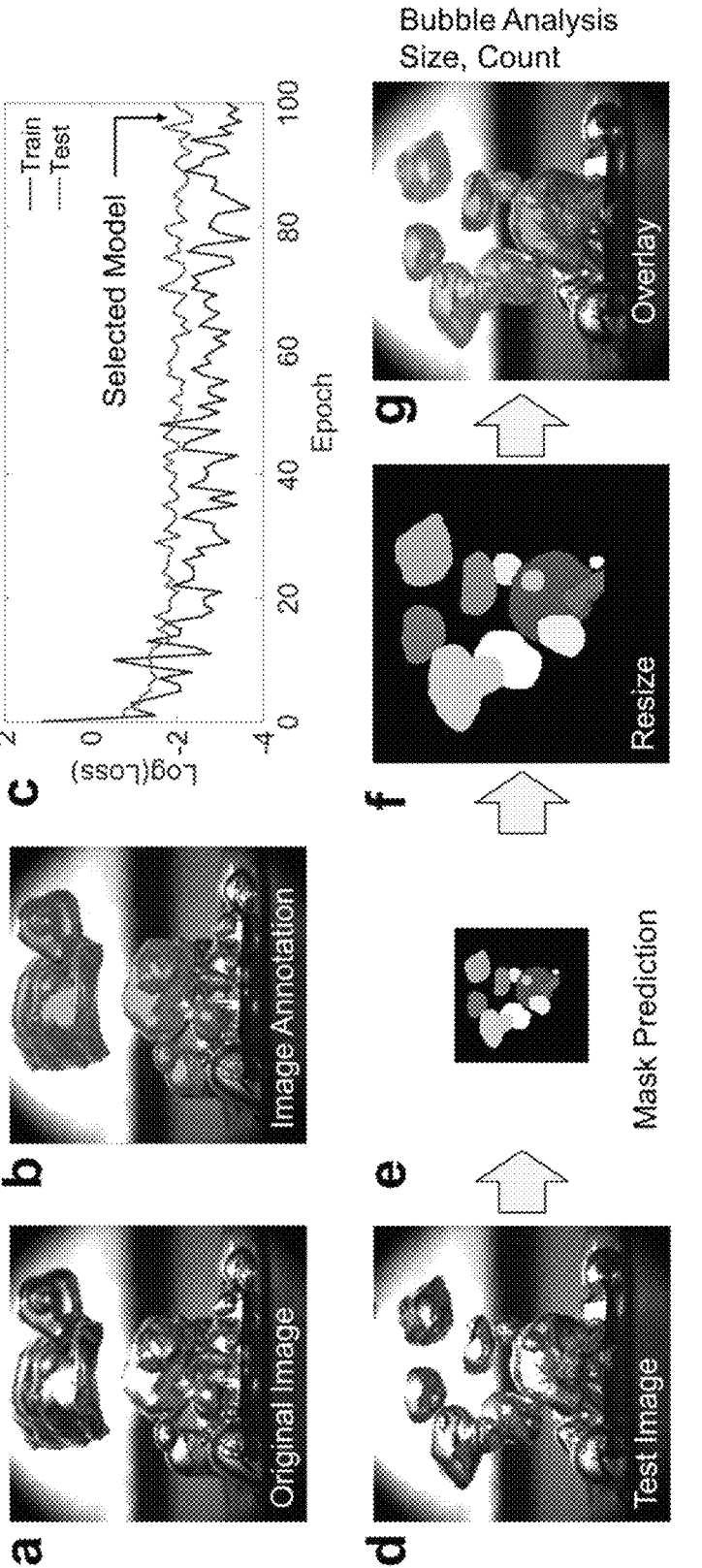
FIG. 11 illustrates instance segmentation via Mask R-CNN in accordance with an embodiment of the invention.

Segmentation models (e.g., Mask R-CNN) can generate pixel-wise masks that can be used to extract bubble statistics for each image (FIG. 11). As a brief description, Mask R-CNN builds on the previous semantic segmentation model, Faster R-CNN, and consists of a backbone neural network architecture Residual Learning Network (ResNet) for deep feature learning and feature extraction. Feature Pyramid Networks (FPNs) improve object representation, while Regional Proposal Networks (RPNs) and Region of Interest Align (RolAlign) functions, which returns candidate bounding boxes. The bounding boxes are applied with bilinear interpolation to predict pixel-accurate masks.

Figure 12:
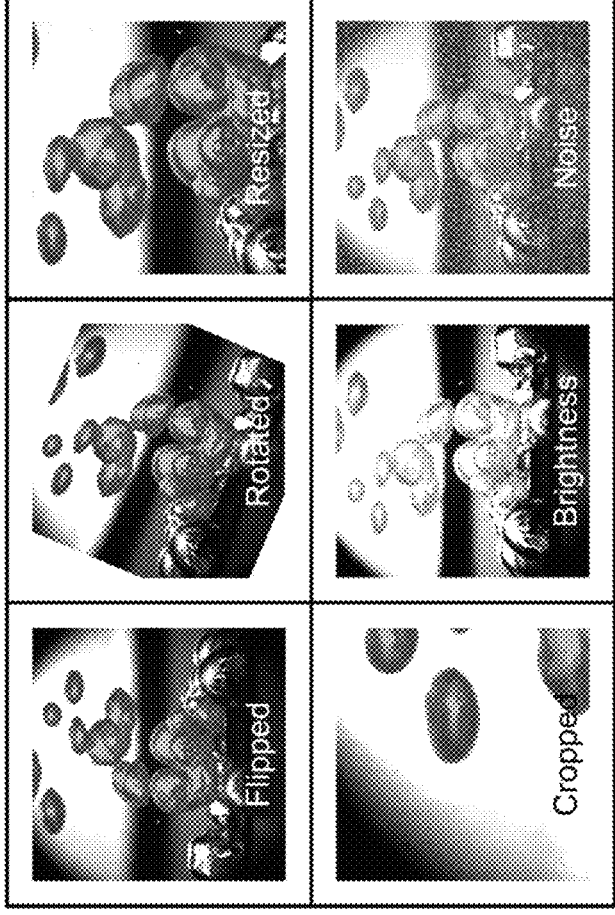
FIG. 12 illustrates examples of data augmentation techniques in accordance with a variety of embodiments of the invention.
Figure 12:
Figure 12:
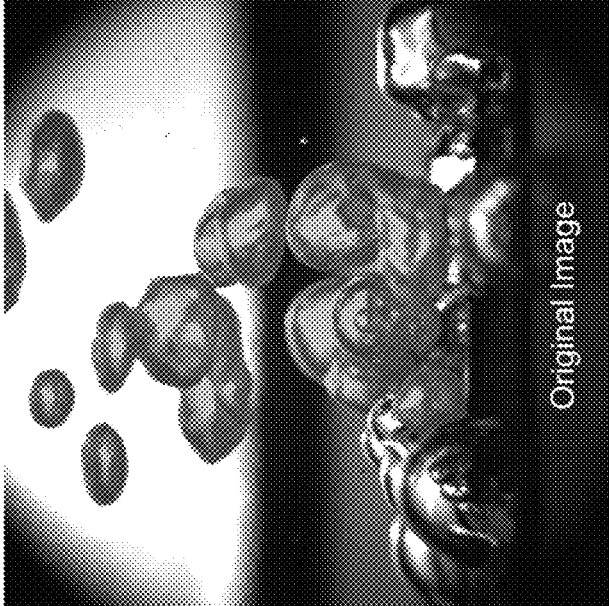

Being a supervised learning model, Mask R-CNN can utilize labelled data in forms of pixel-wise image annotations in order to learn. In a variety of embodiments, commercial annotation software (e.g., SUPERVISELY, San Jose, CA, USA) can be used to manually label arbitrarily selected images from the teaching dataset as shown in FIGS. 11*a* and *b*. The labelling process in accordance with certain embodiments of the invention can be greatly minimized by utilizing data augmentation techniques, which can increase the generalizability of the model by randomly transforming the original data into new, increased, and slightly modified versions (FIG. 12). Augmentations can include (but are not limited to) flipping the image, rotating the image, resizing the image, cropping the image, modifying the brightness of an image, and/or modifying the noise of an image. In this experiment, the augmented dataset consists of 704 images where 80% (564 images) are used as a training set and 20% (140 images) are used for testing. In this example, the model is initialized using weights pre-trained on the Microsoft Common Objects in Context (MSCOCO) dataset. Mask R-CNN trains for a total of 100 epochs using stochastic gradient descent with a learning rate of 1e-3 and momentum of 0.9. A checkpoint at each epoch saves the model's state for optimal model selection. The training results in FIG. 11*c* show that training and test loss both decrease, with a minimum test loss of 0.09 at epoch 98, which has been selected for this study. FIG. 11*d-g* displays the resizing, mask prediction, and overlay process of one example image tested on our trained Mask R-CNN model. Each image describes individual bubble size and count information that are automatically extracted.

Training HyPR, CNN, and MLP Models

Figure 13:
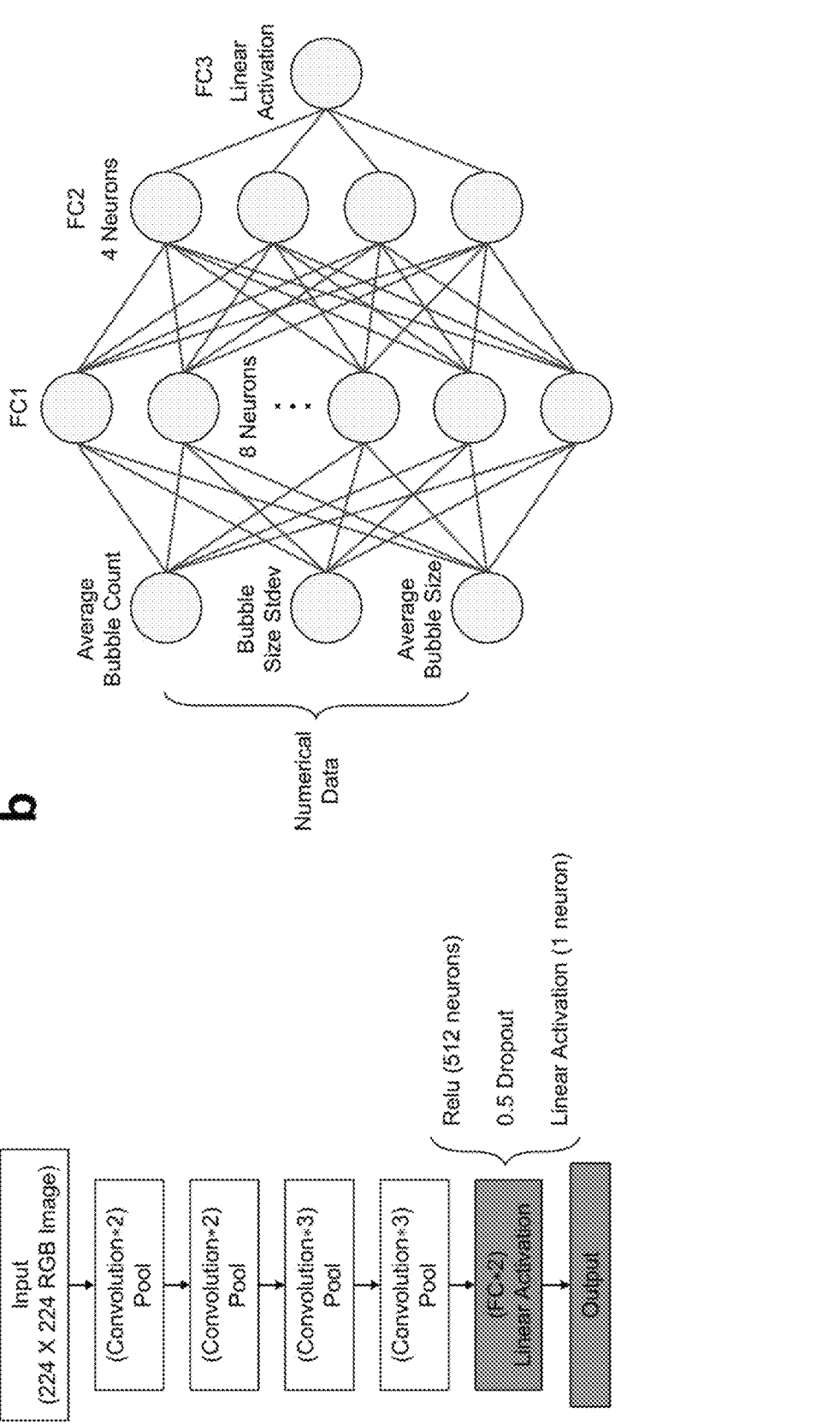
FIG. 13 illustrates CNN and MLP architectures in accordance with an embodiment of the invention.

In an experiment, the HyPR model in accordance with some embodiments of the invention were fine-tuned on ImageNet with an Adam optimizer at a learning rate of 1e-3 for 20 and 100 epochs before and after unfreezing the neural network layers, respectively (FIG. 6*a*). In order to train isolated CNN and MLP models, the fully connected (FC) layers were configured to have 1 output followed by a linear activation function as shown in FIG. 13. The CNN model is fine-tuned with identical settings as the HyPR model, but with learning rates of 4e-5 for 35 epochs before unfreezing all training layers (FIG. 6*b*). After stabilization, the model continues to train with all layers unfrozen for 100 epochs with learning rates of 1e-3 (FIG. 6*c*).

Fine-Tuning Deep CNN

Updating and retraining a network on pre-trained weights generally help the training process, even if the weights are trained on images with dissimilar classes, because they usually share many lower-level image features involving edges, textures, and shapes. Processes in accordance with numerous embodiments of the invention can utilize model weights pre-trained on other datasets (e.g., ImageNet, a vast dataset of over 15 million labeled high-resolution images). As shown in FIG. 7*a*, the default pre-trained VGG16 architecture consists of 16 weight layers (convolution and FC layers) followed by a softmax function typically used for image classification. Custom FC layers with a single output node and linear regression layer replaces the original FC softmax classifier layer, thereby designating a new task (bubble recognition) to the model and enabling continuous quantity prediction (FIG. 7*b*). To prevent risk of destroying already learned layers, processes in accordance with a number of embodiments of the invention can initially freeze the early neural network layers and train the model at a low learning rate (FIG. 7*c*). After the stabilization, the layers can be unfrozen and training can continue until appropriate accuracies are achieved (FIG. 7*d*).

Figure 7:
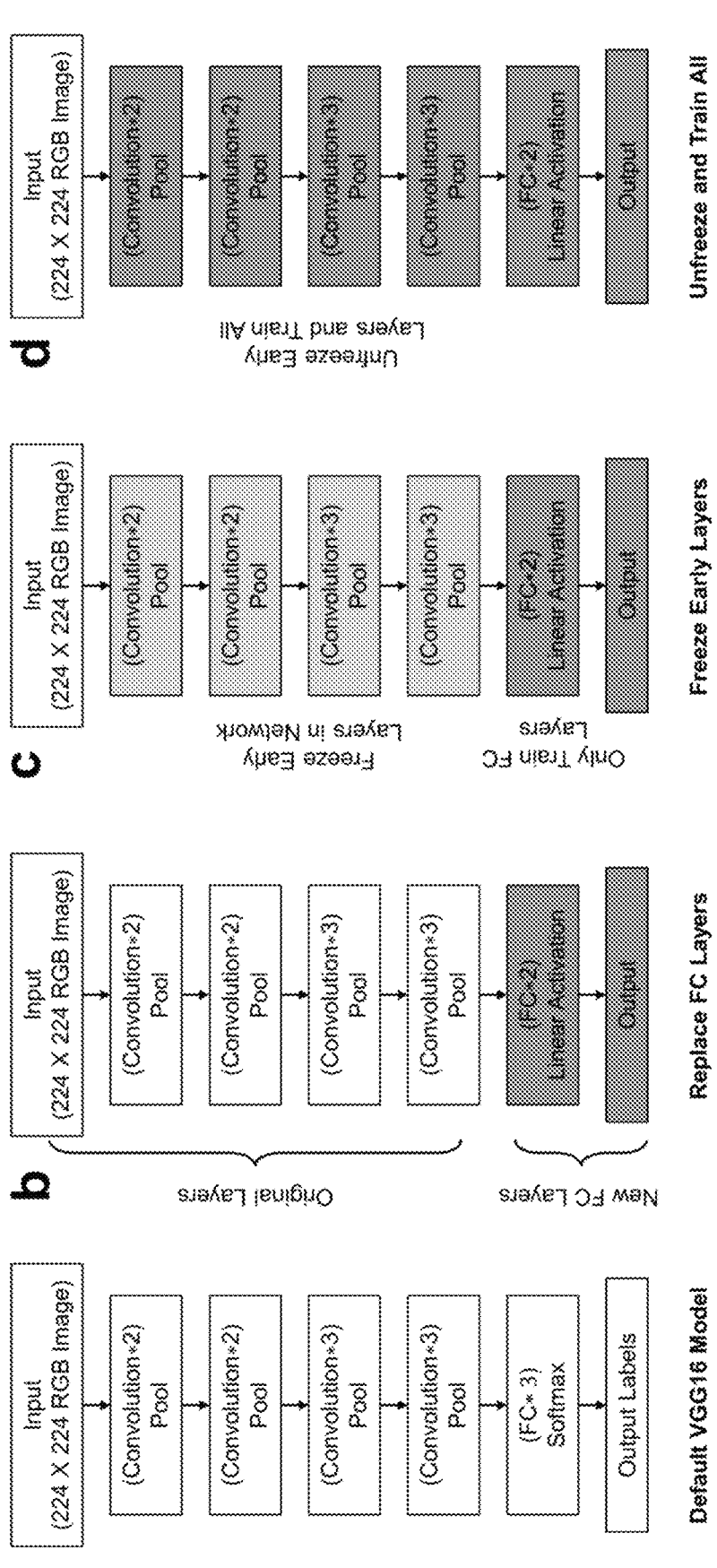
FIG. 7 illustrates an example of fine tuning VGG16 in accordance with an embodiment of the invention.

FIG. 7 illustrates an example of fine tuning VGG16 in accordance with an embodiment of the invention. The original VGG16 network architecture is simplified by boxing convolution layers between every pooling. The fully connected (FC) layers can be replaced with customized FC layers followed by linear activation. The new FC layers start with a 512 neurons FC layer followed by a dropout function of 0.5 for regularization. Then, the output can be set to a singular node and applied with linear activation for regression problems. The substituted FC layers can be totally new and random, risking to destroying already learned features. Therefore, the first few epochs can be run while freezing early layers (gray) in the network to prevent backpropagation after the FC layers. After the calculations stabilize, all layers can be unfrozen and continue to learn at small learning rates until sufficient accuracy is obtained. The purple color represents layers that are being updated.

Figure 8:
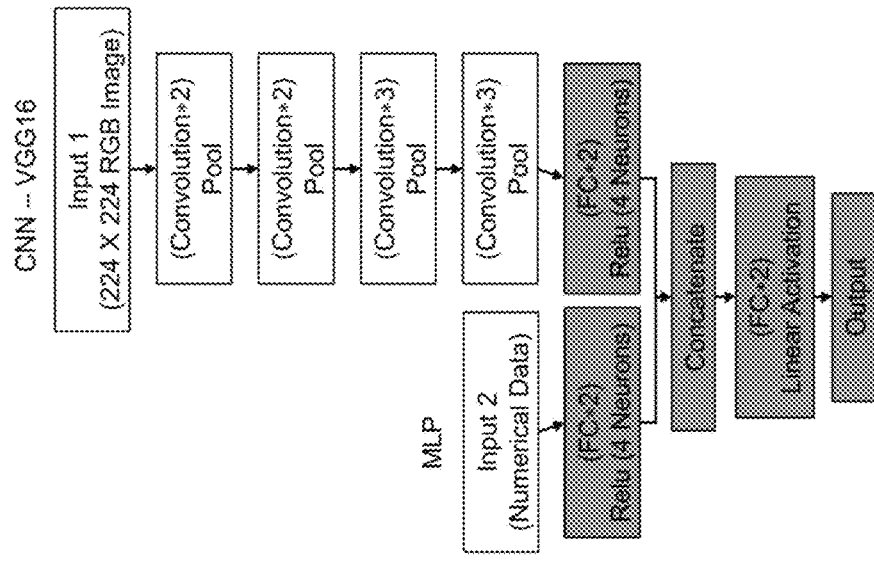
FIG. 8 illustrates a HyPR architecture in accordance with an embodiment of the invention.
Figure 8:
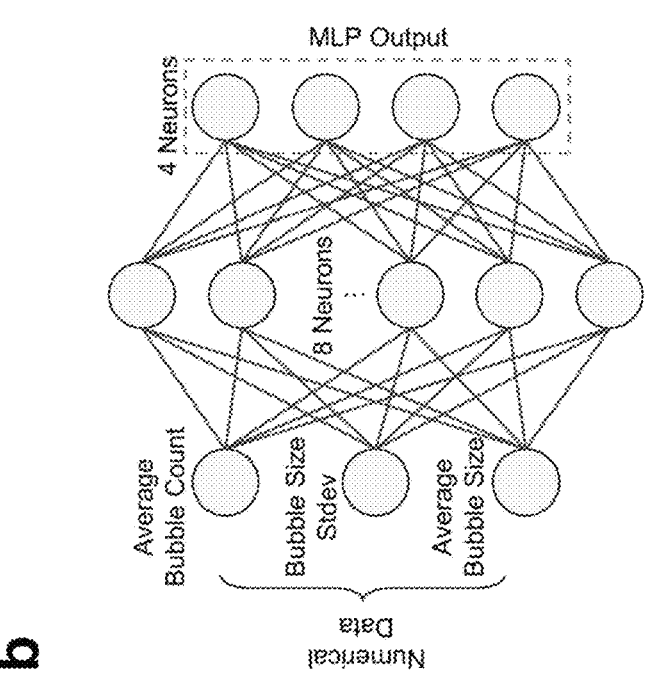

FIG. 8 illustrates a HyPR architecture in accordance with an embodiment of the invention. The convolution neural networks (CNN) model and custom multi-layer perception (MLP) neural networks can be configured to have 4 output neurons. Then, the CNN and MLP outputs can be concatenated and applied with a linear activation function to predict the output boiling heat flux. The purple color represents layers that are being modified.

Figure 9:
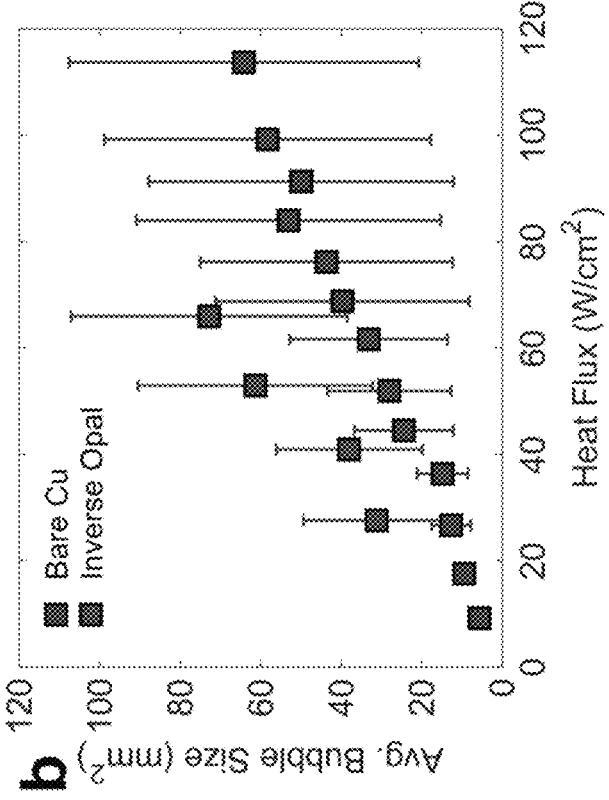
FIG. 9 illustrates charts of bubble characteristics of bare and nanotextured surfaces.
Figure 9:
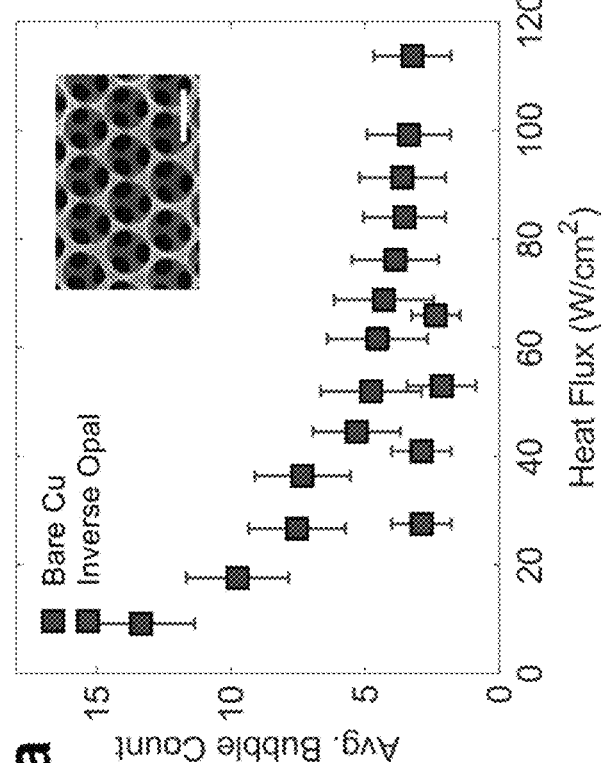

FIG. 9 illustrates charts of bubble characteristics of bare and nanotextured surfaces. In the first chart, the average bubble count for the nanotextured substrate is significantly lower than the bare substrate even at low heat fluxes, which suggests active bubble coalescence. The inset shows scanning electron microscope images of the nanotextured structure where the scale bar is 1 μm. The second chart shows that the average bubble size on the nanotextured surface is relatively larger than bare substrate but increase at similar slopes.

Uncertainty Analysis for Pool Boiling Experiment

The uncertainties can be computed by using the law of propagation of uncertainty. The heat flux $q''=k\Delta T/L$ is a function of temperature gradients, material properties, and thermocouple positions. Specifically, $q''$ is calculated by averaging the $q''$ obtained from thermocouples 1-4:

$$q'' = k\left[\frac{\left(\frac{T_1 - T_2}{L_1}\right) + \left(\frac{T_2 - T_3}{L_2}\right) + \left(\frac{T_3 - T_4}{L_3}\right)}{3}\right] \quad (S1)$$

where $T_{i=1,2,3,4}$ are the temperature readings from the four thermocouples used in the experiment, k is the thermal conductivity, and $L_{i=1,2,3}$ are the distance between thermocouples.

Focus can be placed on the uncertainties caused by thermocouple readings ($U_T=\pm1.1°$ C.) by assuming that the thermal conductivity remains constant during experiments and that positional errors are minimized. Therefore, the uncertainty of the heat flux becomes:

$$U_{q''} = \sqrt{\left(\frac{\partial q''}{\partial T_1} U_T\right)^2 + \left(\frac{\partial q''}{\partial T_2} U_T\right)^2 + \left(\frac{\partial q''}{\partial T_3} U_T\right)^2 + \left(\frac{\partial q''}{\partial T_4} U_T\right)^2} \qquad \text{(S2)}$$

By solving for Eqn. (S2), an uncertainty of approximately 2.2% is calculated for the maximum heat flux.

Figure 10:
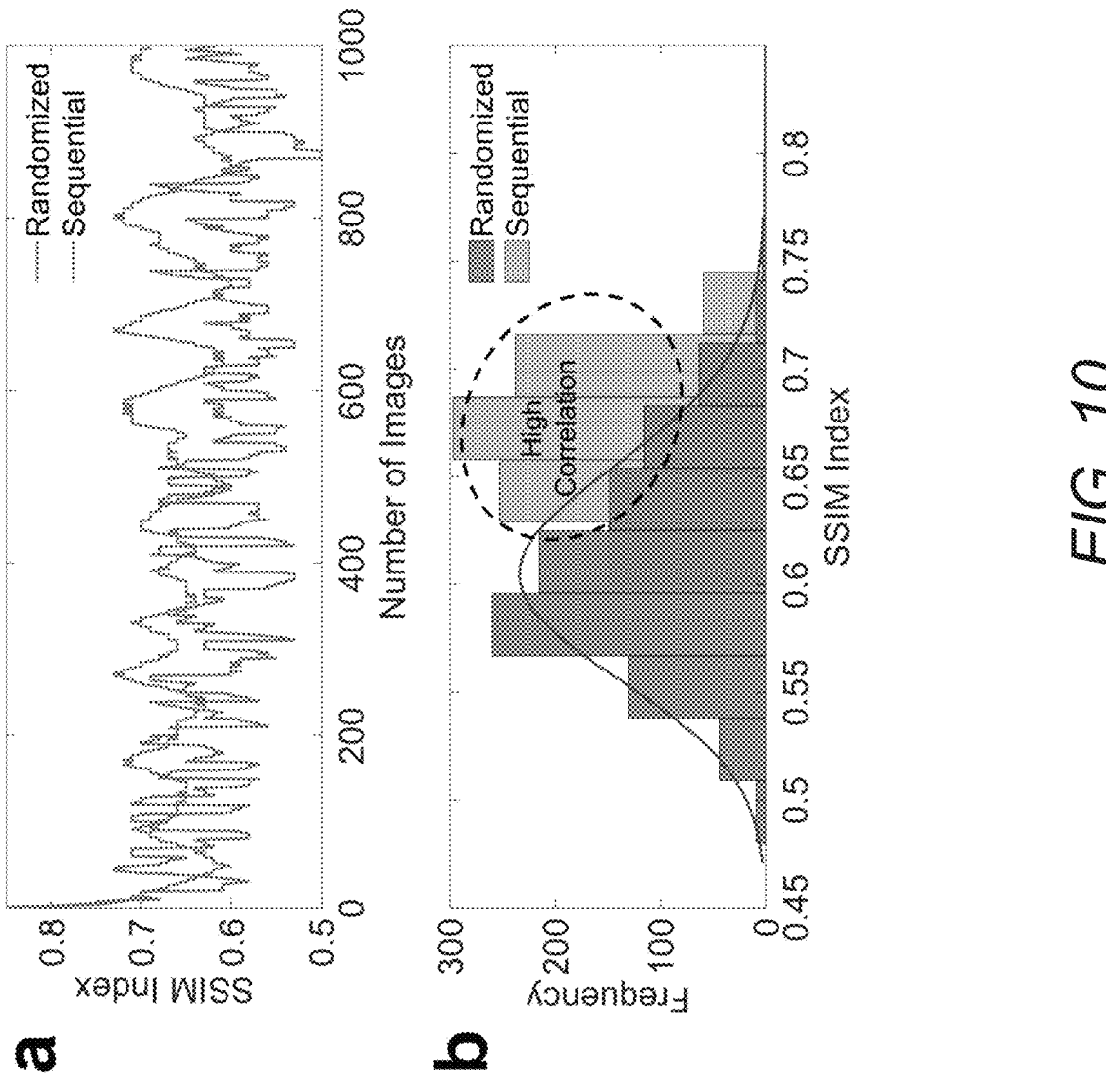
FIG. 10 illustrates a comparison of randomized and sequential imaging.

FIG. 10 illustrates a comparison of randomized and sequential imaging. The structural similarity index (SSIM) compares the similarity between two images, where 0 corresponds to no similarity and 1 infers identicalness. The first chart shows that randomized imaging diversifies the image dataset. SSIM plots the difference between 1000 images and one reference image (image number 0). In the second chart, randomized images have lower and more widely distributed SSIM and therefore less bias.

FIG. 11 illustrates instance segmentation via Mask R-CNN in accordance with an embodiment of the invention. To train Mask R-CNN on a new task, images must be manually labeled (i.e., annotated). The representative example images show before (a) and after (b) annotation. The chart illustrates training results for Mask R-CNN which show an optimal checkpoint at epoch 98 which is selected to analyze bubbles throughout this study. The images are processed through a series of steps, including masking (e), resizing (f), and final overlaying (g) to produce the segmented image output. The output enables to identify bubble statistics (i.e., bubble counts and size per frame) used as input features.

FIG. 12 illustrates examples of data augmentation techniques in accordance with a variety of embodiments of the invention. In a, an example image of an annotated image used for Mask R-CNN training is shown. In b, data augmentation diversifies the training dataset by flipping, rotating, resizing, cropping, changing the brightness, and/or introducing noise to the original image. It should be noted that significantly less aggressive data augmentation can be employed when training CNN and CNN+MLP models to prevent invalid inputs.

FIG. 13 illustrates CNN and MLP architectures in accordance with an embodiment of the invention. The first diagram illustrates that the final FC layer of the isolated CNN model is set to 1 neuron followed by linear activation to produce the heat flux output. The input to the CNN model is RGB boiling images. The second diagram shows that the input to the MLP model includes the average bubble count, bubble size standard deviation, and average bubble size. The FC layers are set to have 8, 4, and 1 hidden unit (i.e., neurons), respectively followed by linear activation.

Systems for Smart Boiling Analysis

Smart Boiling Analysis System

Figure 14:
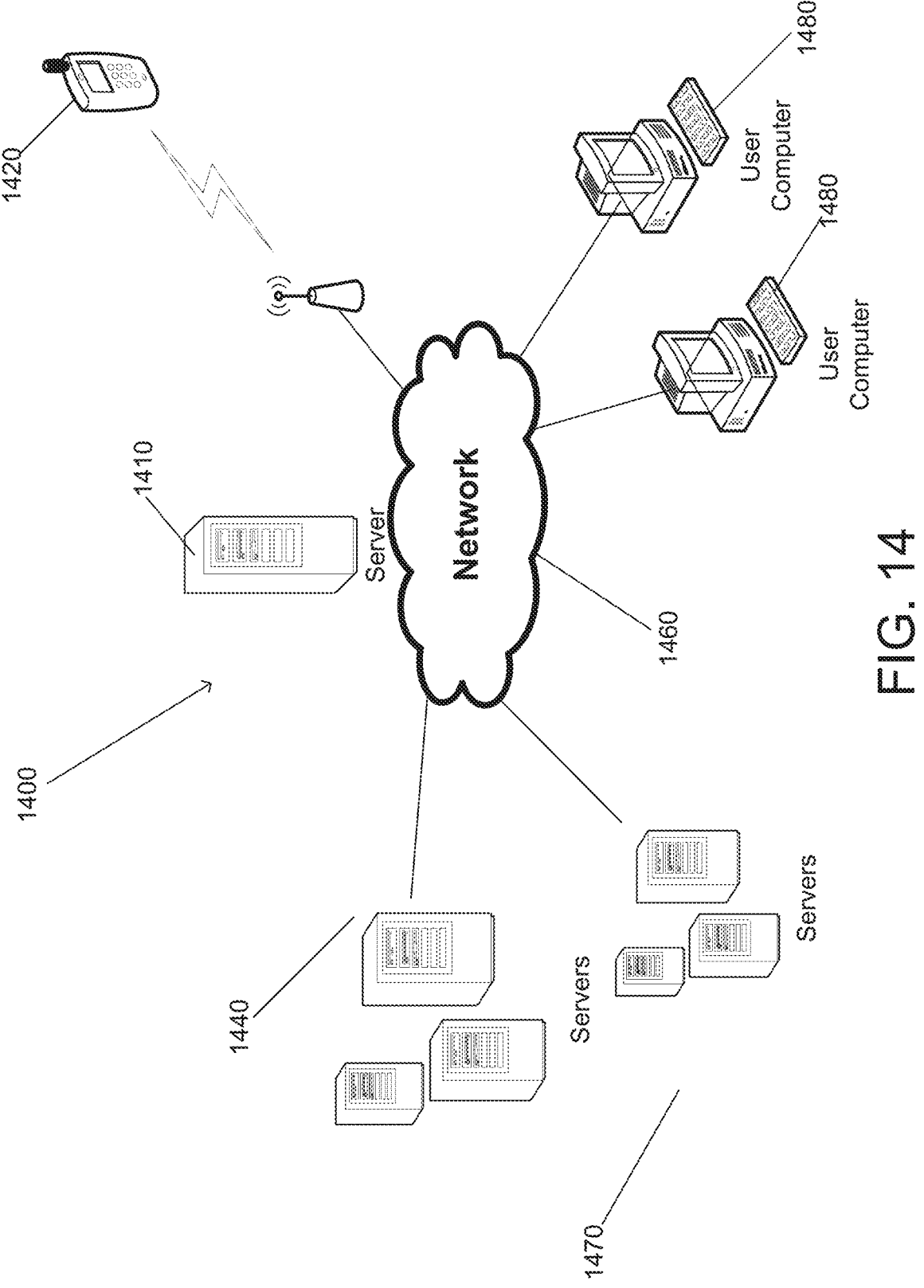
FIG. 14 illustrates an example of a smart boiling analysis system that analyzes boiling in accordance with an embodiment of the invention.

An example of a smart boiling analysis system that analyzes boiling in accordance with an embodiment of the invention is illustrated in FIG. 14. Network 1400 includes a communications network 1460. The communications network 1460 is a network such as the Internet that allows devices connected to the network 1460 to communicate with other connected devices. Server systems 1410, 1440, and 1470 are connected to the network 1460. Each of the server systems 1410, 1440, and 1470 is a group of one or more servers communicatively connected to one another via internal networks that execute processes that provide cloud services to users over the network 1460. One skilled in the art will recognize that a smart boiling analysis system may exclude certain components and/or include other components that are omitted for brevity without departing from this invention.

For purposes of this discussion, cloud services are one or more applications that are executed by one or more server systems to provide data and/or executable applications to devices over a network. The server systems 1410, 1440, and 1470 are shown each having three servers in the internal network. However, the server systems 1410, 1440 and 1470 may include any number of servers and any additional number of server systems may be connected to the network 1460 to provide cloud services. In accordance with various embodiments of this invention, a smart boiling analysis system that uses systems and methods that analyze in accordance with an embodiment of the invention may be provided by a process being executed on a single server system and/or a group of server systems communicating over network 1460.

Users may use personal devices 1480 and 1420 that connect to the network 1460 to perform processes that analyze boiling in accordance with various embodiments of the invention. In the shown embodiment, the personal devices 1480 are shown as desktop computers that are connected via a conventional "wired" connection to the network 1460. However, the personal device 1480 may be a desktop computer, a laptop computer, an imaging system, a boiling rig, or any other device that connects to the network 1460 via a "wired" connection. The mobile device 1420 connects to network 1460 using a wireless connection. A wireless connection is a connection that uses Radio Frequency (RF) signals, Infrared signals, or any other form of wireless signaling to connect to the network 1460. In the example of this figure, the mobile device 1420 is a mobile telephone. However, mobile device 1420 may be a mobile phone, Personal Digital Assistant (PDA), a tablet, a smartphone, an imaging system, a boiling rig, or any other type of device that connects to network 1460 via wireless connection without departing from this invention.

As can readily be appreciated the specific computing system used to analyze boiling is largely dependent upon the requirements of a given application and should not be considered as limited to any specific computing system(s) implementation. For example, although the example above describes various elements in a network, smart boiling systems in accordance with several embodiments of the invention can operate without a network at all, where operations are performed on a single device (e.g., a mobile device) to capture, analyze, and/or control operations of a boiling system, without communicating over any external networks.

Figure 15:
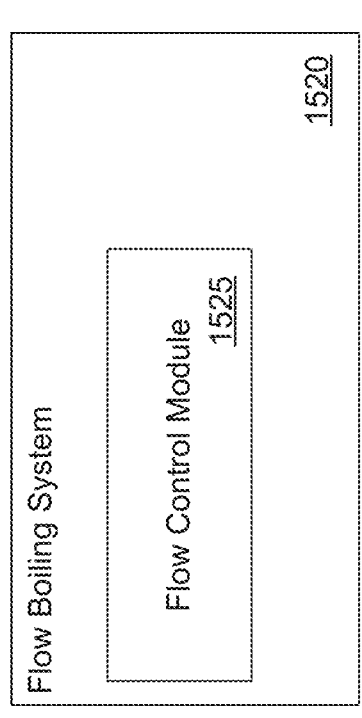
FIG. 15 illustrates another example of a smart flow boiling system in accordance with certain embodiments of the invention.

Another example of a smart flow boiling system in accordance with certain embodiments of the invention is illustrated in FIG. 15. In this example, smart boiling model 1505 can receive boiling images from imaging system 1510 to control flow boiling system 1520. Smart boiling models in accordance with various embodiments of the invention can manage a flow boiling system through flow control module 1525 to control the flow rates of the flow boiling system.

Smart Boiling Analysis Element

Figure 16:
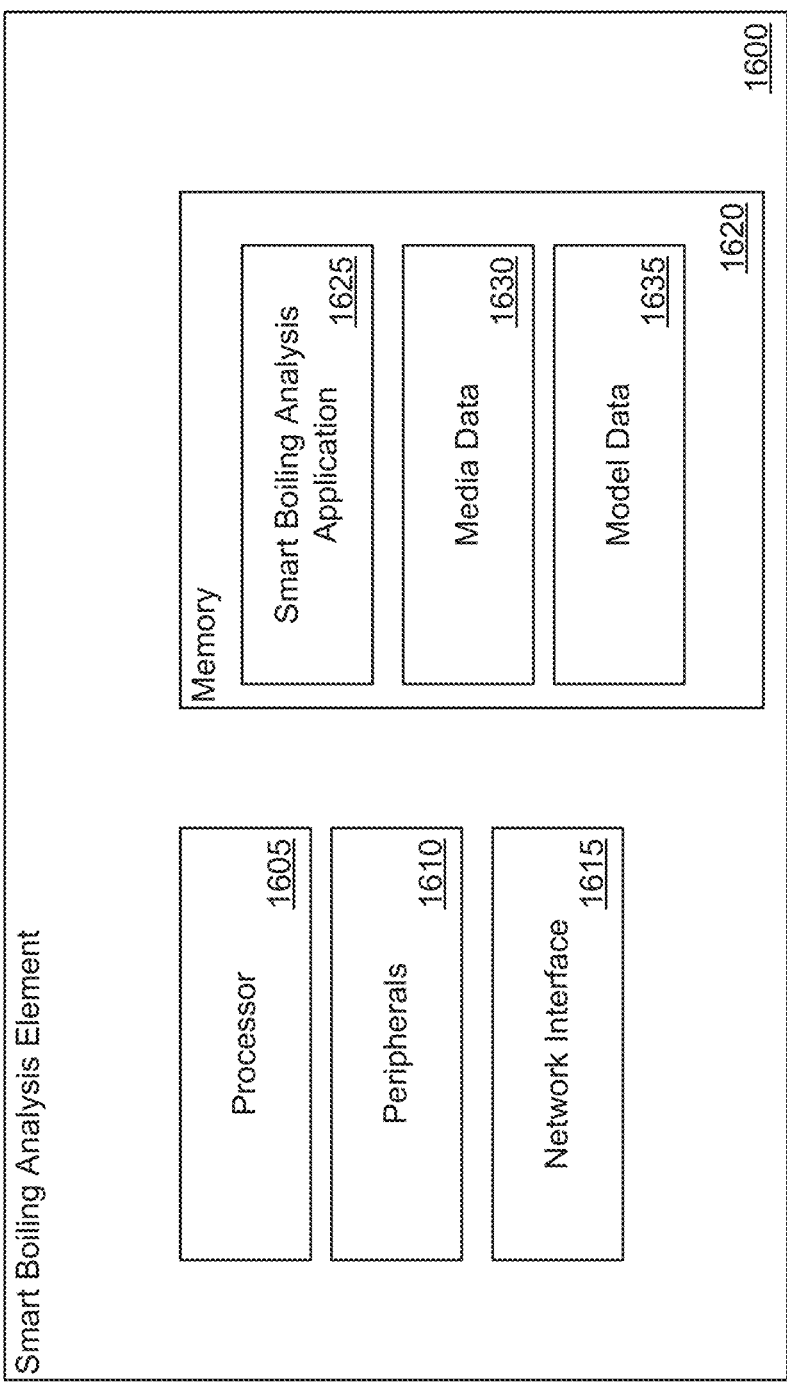
FIG. 16 illustrates an example of a smart boiling analysis element that executes instructions to perform processes that analyze boiling in accordance with an embodiment of the invention.

An example of a smart boiling analysis element that executes instructions to perform processes that analyze boiling in accordance with an embodiment of the invention is illustrated in FIG. 16. Smart boiling analysis elements in accordance with many embodiments of the invention can include (but are not limited to) one or more of mobile devices, cameras, and/or computers. Smart boiling analysis element 1600 includes processor 1605, peripherals 1610, network interface 1615, and memory 1620. One skilled in the art will recognize that a smart boiling analysis element may exclude certain components and/or include other components that are omitted for brevity without departing from this invention.

The processor 1605 can include (but is not limited to) a processor, microprocessor, controller, or a combination of processors, microprocessor, and/or controllers that performs instructions stored in the memory 1620 to manipulate data stored in the memory. Processor instructions can configure the processor 1605 to perform processes in accordance with certain embodiments of the invention.

Peripherals 1610 can include any of a variety of components for capturing data, such as (but not limited to) cameras, displays, and/or sensors. Sensors in accordance with some embodiments of the invention can measure various signals, such as (but are not limited to) images, temperature, sound, motion, etc. In a variety of embodiments, peripherals can be used to gather inputs and/or provide outputs. Smart boiling analysis element 1600 can utilize network interface 1615 to transmit and receive data over a network based upon the instructions performed by processor 1605. Peripherals and/ or network interfaces in accordance with many embodiments of the invention can be used to gather inputs that can be used to analyze boiling.

Memory 1620 includes a smart boiling analysis application 1625, model data 1630, and training data 1635. Smart boiling analysis applications in accordance with several embodiments of the invention can be used to analyze boiling and/or to control flow for flow boiling systems.

Media data in accordance with a variety of embodiments of the invention can include various types of media data that can be used in evaluation processes. In certain embodiments, media data can include (but is not limited to) video, images, audio, etc.

In several embodiments, model data can store various parameters and/or weights for smart boiling models. Models in accordance with certain embodiments of the invention can include (but are not limited to) CNNs, Mask R-CNNs, MPLs, RNNs, etc. Model data in accordance with many embodiments of the invention can be updated through training on media data (e.g., boiling images and/or heat flux) captured on a smart boiling analysis element or can be trained remotely and updated at a smart boiling analysis element.

Although a specific example of a smart boiling analysis element 1600 is illustrated in this figure, any of a variety of smart boiling analysis elements can be utilized to perform processes for smart boiling analysis similar to those described herein as appropriate to the requirements of specific applications in accordance with embodiments of the invention.

Smart Boiling Analysis Application

Figure 17:
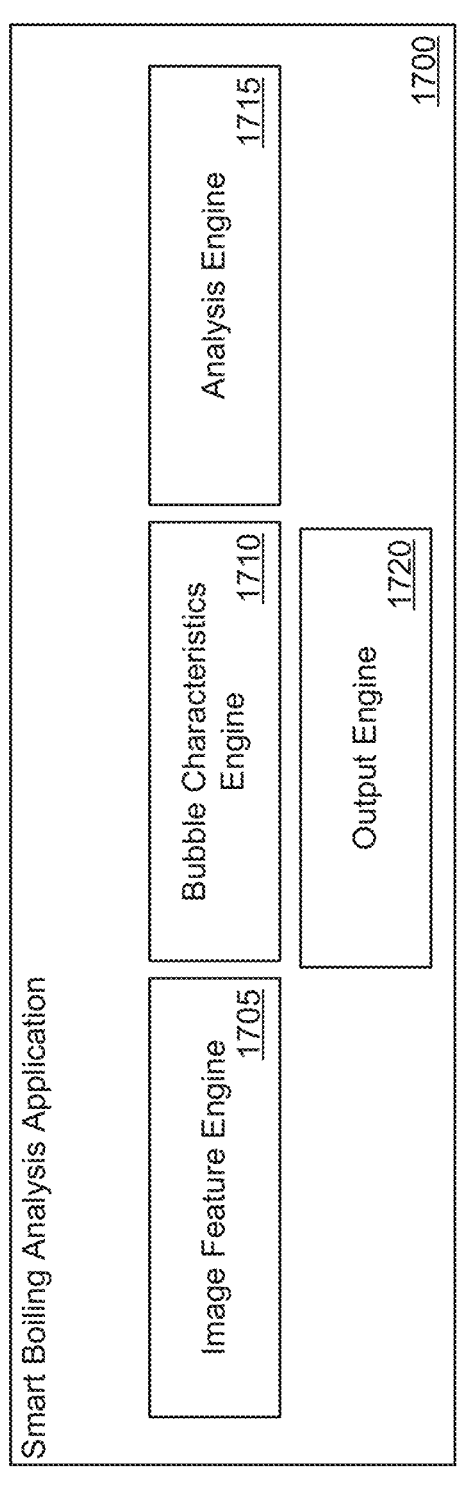
FIG. 17 illustrates an example of a smart boiling analysis application for smart boiling analysis in accordance with an embodiment of the invention.

An example of a smart boiling analysis application for smart boiling analysis in accordance with an embodiment of the invention is illustrated in FIG. 17. Smart boiling analysis application 1700 includes image feature engine 1705, bubble characteristics engine 1710, analysis engine 1715, and output engine 1720. One skilled in the art will recognize that a smart boiling analysis application may exclude certain components and/or include other components that are omitted for brevity without departing from this invention.

Image feature engines in accordance with a number of embodiments of the invention can analyze images to determine image features. In numerous embodiments, image feature engines can include a convolutional neural network (CNN) trained to identify hierarchical image features. Image features in accordance with some embodiments of the invention can be used as inputs to an analysis engine.

In some embodiments, bubble characteristics engines can analyze boiling images to determine a set of one or more bubble characteristics. Bubble characteristics in accordance with several embodiments of the invention can include (but are not limited to) bubble size, bubble count, etc.

Analysis engines in accordance with many embodiments of the invention can take outputs from image feature engines and/or bubble characteristics engines to analyze boiling conditions. In a number of embodiments, analysis engines can predict boiling heat flux based on a set of boiling images. Analysis engines in accordance with several embodiments of the invention can predict a flow rate to achieve a desired heat flux level.

Output engines in accordance with several embodiments of the invention can provide a variety of outputs, including (but not limited to) control signals to control a flow boiling system, alerts or notifications regarding boiling heat flux, status of boiling surfaces, etc.

Although a specific example of a smart boiling analysis application is illustrated in this figure, any of a variety of Smart Boiling Analysis applications can be utilized to perform processes for Smart Boiling Analysis similar to those described herein as appropriate to the requirements of specific applications in accordance with embodiments of the invention.

Although specific methods of smart boiling analysis are discussed above, many different methods of smart boiling analysis can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for smart boiling analysis, the method comprising:
   receiving a set of one or more boiling images;
   identifying a set of bubble characteristics from the set of boiling images using a first image-based model;
   identifying a set of image features from the set of boiling images using a second image-based model;
   predicting a set of boiling heat characteristics based on a combination of the identified set of bubble characteristics and the identified set of image features; and
   controlling a flow boiling system based on the predicted set of boiling heat characteristics.

2. The method of claim 1, wherein the set of bubble characteristics comprises at least one of the set consisting of bubble size and bubble count.

3. The method of claim 1, wherein the first model comprises a Mask R-CNN model and a multilayer perceptron (MLP) model.

4. The method of claim 1, wherein the second model comprises a convolutional neural network (CNN), wherein the set of image features comprises features identified at a set of one or more layers of the CNN.

5. The method of claim 1, wherein the set of boiling heat characteristics comprises at least one of the set consisting of critical heat flux (CHF) and heat transfer coefficient (HTC).

6. The method of claim 1, wherein controlling the flow boiling system comprises:

determining a target flow rate to achieve a desired set of boiling heat characteristics in the flow boiling system; and communicating with the flow boiling system to achieve the target flow rate.

7. A non-transitory machine readable medium containing processor instructions for smart boiling analysis, where execution of the instructions by a processor causes the processor to perform a process that comprises:

receiving a set of one or more boiling images;

identifying a set of bubble characteristics from the set of boiling images using a first image-based model;

identifying a set of image features from the set of boiling images using a second image-based model;

predicting a set of boiling heat characteristics based on a combination of the identified set of bubble characteristics and the identified set of image features; and controlling a flow boiling system based on the predicted set of boiling heat characteristics.

8. The non-transitory machine readable medium of claim 7, wherein the set of bubble characteristics comprises at least one of the set consisting of bubble size and bubble count.

9. The non-transitory machine readable medium of claim 7, wherein the first model comprises a Mask R-CNN model and a multilayer perceptron (MLP) model.

10. The non-transitory machine readable medium of claim 7, wherein the second model comprises a convolutional neural network (CNN), wherein the set of image features comprises features identified at a set of one or more layers of the CNN.

11. The non-transitory machine readable medium of claim 7, wherein the set of boiling heat characteristics comprises at least one of the set consisting of critical heat flux (CHF) and heat transfer coefficient (HTC).

12. The non-transitory machine readable medium of claim 7, wherein controlling the flow boiling system comprises:

determining a target flow rate to achieve a desired set of boiling heat characteristics in the flow boiling system; and communicating with the flow boiling system to achieve the target flow rate.

13. A smart boiling analysis system comprising:

a set of one or more processors; and a memory connected to the set of processors, the memory storing instructions executable by the set of processors to:

receive a set of one or more boiling images from an imaging system;

identify a set of bubble characteristics from the set of boiling images using a first image-based model;

identify a set of image features from the set of boiling images using a second image-based model;

predict a set of boiling heat characteristics based on a combination of the identified set of bubble characteristics and the identified set of image features; and control a flow boiling system based on the predicted set of boiling heat characteristics.

14. The smart boiling analysis system of claim 13, wherein the set of bubble characteristics comprises at least one of the set consisting of bubble size and bubble count.

15. The smart boiling analysis system of claim 13, wherein the first model comprises a Mask R-CNN model and a multilayer perceptron (MLP) model.

16. The smart boiling analysis system of claim 13, wherein the second model comprises a convolutional neural network (CNN), wherein the set of image features comprises features identified at a set of one or more layers of the CNN.

17. The smart boiling analysis system of claim 13, wherein the set of boiling heat characteristics comprises at least one of the set consisting of critical heat flux (CHF) and heat transfer coefficient (HTC).

18. The smart boiling analysis system of claim 13, wherein the instructions executable by the set of processors to control the flow boiling system comprise instructions to:

determine a target flow rate to achieve a desired set of boiling heat characteristics in the flow boiling system; and communicate with the flow boiling system to achieve the target flow rate.

* * * * *